United States Patent
Wolf et al.

(10) Patent No.: US 11,470,408 B2
(45) Date of Patent: Oct. 11, 2022

(54) TEST INSTRUMENTS AND METHODS FOR EMULATING OPTICAL NETWORK TERMINAL (ONT) DEVICES AND TESTING OPTICAL NETWORKS BASED ON THE EMULATION

(71) Applicant: VIAVI SOLUTIONS INC., San Jose, CA (US)

(72) Inventors: Hans Joerg Wolf, Woodbine, MD (US); Reynald Dupuis, Germantown, MD (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 17/014,521

(22) Filed: Sep. 8, 2020

(65) Prior Publication Data
US 2021/0076113 A1  Mar. 11, 2021

Related U.S. Application Data

(60) Provisional application No. 62/897,709, filed on Sep. 9, 2019.

(51) Int. Cl.
*H04Q 11/00* (2006.01)
*H04B 10/073* (2013.01)
*H04J 14/02* (2006.01)
*H04B 10/272* (2013.01)
*H04B 10/07* (2013.01)

(52) U.S. Cl.
CPC ......... *H04Q 11/0067* (2013.01); *H04B 10/07* (2013.01); *H04B 10/073* (2013.01); *H04B 10/272* (2013.01); *H04J 14/0282* (2013.01); *H04Q 11/0071* (2013.01); *H04Q 2011/0079* (2013.01)

(58) Field of Classification Search
CPC .... H04B 10/272; H04B 10/07; H04B 10/073; H04Q 2011/0079
See application file for complete search history.

(56) References Cited

U.S. PATENT DOCUMENTS

2009/0074412 A1\* 3/2009 Liu .................. H04L 43/50
 398/59
2009/0324228 A1\* 12/2009 Bernard .............. H04J 14/0227
 398/79

(Continued)

FOREIGN PATENT DOCUMENTS

EP 2717593 \* 9/2014 ............. H04Q 11/00

*Primary Examiner* — Nathan M Cors
(74) *Attorney, Agent, or Firm* — Mannava & Kang, P.C.

(57) ABSTRACT

Disclosed are apparatuses and testing methods for emulating an Optical Network Terminal (ONT) device for communicating or otherwise working with an Optical Line Terminal (OLT) device that was configured to operate with the ONT device. Such emulation may include configuring various settings of the apparatus so that the apparatus may appear to the OLT to be the ONT device. For example, the emulation may include accessing and using authentication/authorization related settings and network configuration settings of the ONT, thus permitting the apparatus to connect to a Passive Optical Network and test services and the quality of service experience without having to reconfigure the OLT.

20 Claims, 14 Drawing Sheets

(56) References Cited

U.S. PATENT DOCUMENTS

| | | | |
|---|---|---|---|
| 2012/0099436 A1* | 4/2012 | Afzal | H04B 10/071 |
| | | | 370/241 |
| 2014/0255027 A1* | 9/2014 | Hood | H04Q 11/0067 |
| | | | 398/58 |
| 2016/0044391 A1* | 2/2016 | Wu | H04B 10/271 |
| | | | 398/45 |
| 2016/0119058 A1* | 4/2016 | Wang | H04B 10/272 |
| | | | 398/58 |
| 2021/0195303 A1* | 6/2021 | Uematsu | H04B 10/07953 |

\* cited by examiner

800

Receive a plurality of workflow profiles, each workflow profile of the plurality of workflow profiles comprising a plurality of parameters for executing a respective service performance test
802

↓

Store the plurality of workflow profiles in the data storage
804

↓

Determine that a input member of the plurality of input members was actuated
806

↓

Identify a workflow profile based on the actuated input member
808

↓

Obtain the plurality of workflow parameters of the workflow profile from the data storage
810

↓

Execute a service performance test based on the plurality of workflow parameters
812

Identify ONT information that describes an ONT and is used to configure an OLT to work with the ONT
1202

↓

Configure a test instrument based on the ONT information
1204

↓

Establish a connection between the test instrument and the OLT based on the configuring
1206

↓

Conduct, via the test instrument, one or more service tests based on the connection between the test instrument and the OLT
1208

*FIG. 12*

TEST INSTRUMENTS AND METHODS FOR EMULATING OPTICAL NETWORK TERMINAL (ONT) DEVICES AND TESTING OPTICAL NETWORKS BASED ON THE EMULATION

RELATED APPLICATIONS

This application claims priority to U.S. provisional patent application Ser. No. 62/897,709, which was filed on Sep. 9, 2019, the content of which is incorporated herein by reference in its entirety.

TECHNICAL FIELD

This patent application relates generally to passive optical network testing, and more particularly to emulating Optical Network Terminal (ONT) devices and measuring performance in an optical network.

BACKGROUND

A Passive Optical Network (PON) may deliver data communication services via light signals transmitted through optical links such as fiber optic cabling. An Optical Line Terminal (OLT) may provide light signals through various intermediate devices in an optical network to an Optical Network Terminal (ONT), which converts the light signals to electrical signals and provides the electrical signals to a router. The router may propagate data transmission inside the customer premises through the electrical signals, such as through an Ethernet protocol. Outgoing data from the customer premises back through the PON may flow in the opposite direction, in which case the ONT may convert electrical signals into optical signals for propagation through the PON.

Service providers may encounter problems when installing PON services or when troubleshooting PON services at the customer premises. For example, each ONT device may have a pre-set configuration and the OLT may be configured to specifically work with that ONT device. Thus, it may be difficult for providers or others to troubleshoot and segment whether the problem is in the optical network or at the ONT device. Furthermore, testing at the customer premises may not be able to segment and isolate problems.

BRIEF DESCRIPTION OF THE DRAWINGS

Features of the present application may be illustrated by way of example and not limited in the following figure(s), in which like numerals indicate like elements, in which:

FIG. 8 illustrates a method of integrating workflow profiles with UI actuations to trigger service performance tests of an optical network, according to an example;

FIG. 12 illustrates a method of identifying ONT information for emulating different ONTs for testing service performance, according to an example.

DETAILED DESCRIPTION

In the following description, numerous specific details are set forth in order to provide a thorough understanding of the present application. It will be readily apparent however, that the present application may be practiced without limitation to these specific details. In other instances, some methods and structures readily understood by one of ordinary skill in the art have not been described in detail so as not to unnecessarily obscure the description of the present application. Also, for simplicity and illustrative purposes, the present application is described below by referring mainly to examples. As used herein, the terms "a" and "an" are intended to denote at least one of a particular element, the term "includes" means includes but not limited to, the term "including" means including but not limited to, and the term "based on" means based at least in part on.

Examples of an apparatus and testing methods for emulating an ONT device for communicating or otherwise working with an OLT device that was configured to operate with the ONT device is provided. As used herein, the term "generate an emulation" and similar terms, such as "emulating," may refer to copying information of a first device so that the copying device may appear to a second device to be the first device. For example, in the context of an OLT being configured to operate with a specific ONT, an apparatus such as a test device may emulate the specific ONT so that the apparatus appears to the OLT to be the ONT. As such, the apparatus may conduct service tests via connection with the OLT without reconfiguration of the OLT to work with the apparatus. To emulate the ONT, the apparatus may access and use authentication/authorization related settings, network configuration settings, and/or other information of the ONT to permit the apparatus to appear to be the ONT. As such, the apparatus may connect to an OLT and access the PON to test services and the quality of service experience without having to reconfigure the OLT.

Figure 1A:
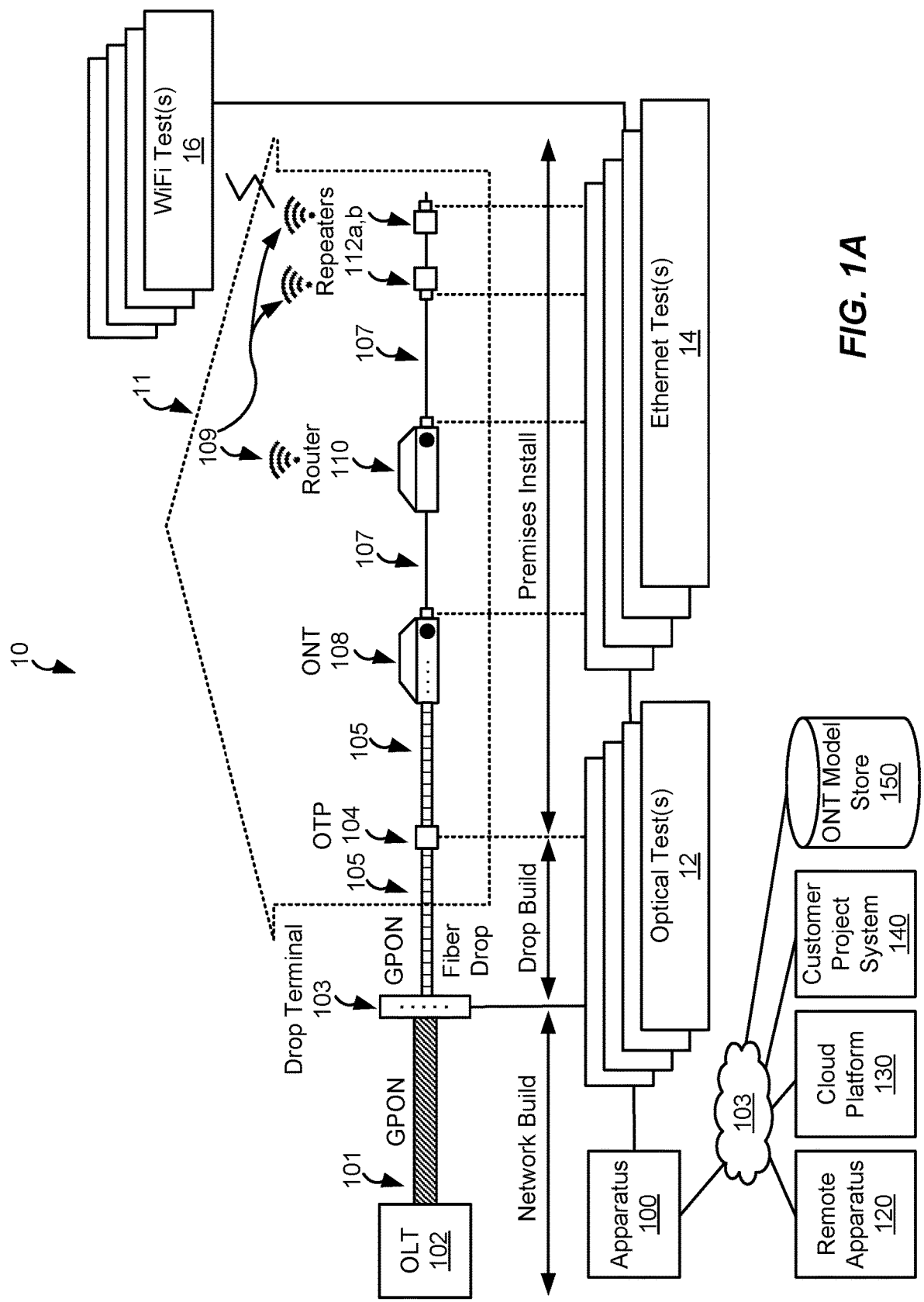
FIG. 1A is a schematic diagram of a network and service environment in which an apparatus may test network services, according to an example.

FIG. 1A is a schematic diagram of a network and service environment 10 in which an apparatus 100 may test network services, according to an example. The network services may include data and/or voice services such as Internet and/or phone service. The network and service environment 10 may include various communication layers (such as physical layers and network layers) and types of communication links over which various devices of the network and service environment 10 facilitate provision of the network services to a premises 11 (referred to hereinafter as premises 11 or "customer premises 11"). For example, the network and service environment 10 may include various types of links such as a feeder fiber optic cable 101, a fiber optic cable 105, an electrical (such as Ethernet) cable 107, and wireless links 109 (such as a WiFi signal). The network and service environment 10 may include various types of devices, which may be connected to one another via the links. The devices may facilitate provision of the network services to the customer premises 11. Such devices may include an Optical Line Terminal (OLT) 102, a drop terminal 103, an Optical Termination Panel (OTP) 104, an Optical Network Terminal (ONT) 108, a router 110, and one or more repeaters 112. The apparatus 100 may execute testing operations through various ones of the links and devices of the network and service environment 10, enabling localization of any problems within the network and service environment 10. Some devices may be omitted from FIG. 1A for illustrative clarity. For example, the OLT 102 may be connected to devices at the premises via one or more splitter devices.

The feeder fiber optic cable 101 may include a physical optical connection between the drop terminal 103 and the OLT 102 of a service provider such as an Internet Service Provider (ISP), which may provide services through a Passive Optical Network (PON). In particular, the PON may include a Gigabit PON (GPON). The PON, and more particularly, the GPON may transmit and receive data in the form of optical signals. The drop terminal 103 is a device that accepts the feeder fiber optic cable 101 and connects fiber optic (the term "fiber optic" may also be referred to interchangeably herein as simply "fiber") cable 105 to the customer premises 11 via the OTP 104. The drop terminal 103 may be located outside (but on or nearby) the customer premises 11 such that it is accessible without entering the customer premises 11. The OTP 104 may be located inside the customer premises and may be connected to the ONT 108 via fiber optic cable 105.

The ONT 108 may be connected to the router 110 through electrical cable 107. The ONT 108 may convert optical signals (transmitted via fiber optic cable 105) to/from the OTP 104 to electrical signals (transmitted via electrical cable 107) to/from the router 110. The router 110 may transmit and receive data transmissions via a wired or wireless connection to end user devices (not illustrated) to connect such devices to a Wide Area Network, such as the Internet through the GPON. In some examples, the router 110 may be connected to one or more repeaters 112 (illustrated as repeaters 112a, b) through electrical cable 107. It should be noted that links (such as various types of cables described herein) with like numerals shown in FIG. 1 illustrate types of cabling and not necessarily a single physical length of cable. For example, the fiber optic cable 105 between the drop terminal 103 and the ONT 108 is not necessarily (and usually is not) a single length of fiber optic cable 105.

When an end user experiences a problem with the network services at the customer premises 11, the ISP may send a technician to troubleshoot the problem. For example, a project in the customer project system 140 may be created to address the problem. In some instances, the project may include a new install and verification of services for the new install at the customer premises 11.

A technical issue arising from optical networks is that testing equipment used at the drop terminal 103 or the OTP 104 may measure only the optical levels coming to the customer premises 11 from the GPON. Such testing may not indicate problems within the customer premises 11 other than the OTP 104. Furthermore, such testing does not provide a real-world test of data transmission rates over the fiber optic cable 105. In other words, optical level measurements do not provide a measure of data transmission rates via the optical signals transmitted through the fiber optic cable 105. As such, the root cause of any problems (usually noticed by an end user at the customer premises 11 as insufficient bandwidth or network speed at end user devices) may be difficult and time consuming to diagnose and correct. Furthermore, end users may be unsatisfied at being informed that the incoming optical signal measured at the OTP 104 or the drop terminal 103 is sufficient. In addition to the foregoing problems, the technician may be unaware of prescribed test operations that should be undertaken to troubleshoot and resolve problems.

Various examples of an apparatus 100 disclosed herein may include technology improvements that address the foregoing and other problems. For instance, the apparatus 100 may perform tests across different types of links at various points in the network and service environment 10, enabling localization of any problems. For example, the apparatus 100 may include a power supply that makes it portable to various locations inside and outside of the customer premises 11 to test at various locations (including throughout the customer premises 11 for WiFi tests 16). In particular, the apparatus 100 may connect to the drop terminal 103 or OTP 104 via fiber optic cable 105 to execute optical tests 12. The apparatus 100 may be connect to an electrical port of the ONT 108, the router 110 or the repeaters 112 via electrical cable 107 to execute Ethernet tests 14. The apparatus 100 may wirelessly connect to the router 110 or the repeaters 112 via wireless link 109 to execute WiFi tests 16. By testing various points and links in the network and service environment 10, the apparatus 100 may be able to localize any problems.

Each of the optical tests 12, Ethernet tests 14, and Wireless Fidelity (WiFi) tests 16 may include a test of the physical layer, the link layer, the network layer, and the service layer, so that multiple layers of each type of connection may be characterized. The physical, link, network, and service layer tests may be specific to each of the optical tests 12, the Ethernet tests 14, and the WiFi tests 16. For example, a physical layer test included in the optical tests 12 may measure optical power levels transmitted over the fiber optic cable 105. A physical layer test included in the Ethernet tests 14 may measure a level of Ethernet traffic flowing through the electrical cable 107 (such as an Ethernet cable). A physical layer test included in the WiFi tests 16 may measure a signal strength of the wireless link 109 from the router 110 or a repeater 112. Other layer tests may likewise be specific to the optical tests 12, Ethernet test 14, and WiFi tests 16 (although some layer tests may be the same throughout the optical tests 12, Ethernet tests 14, and WiFi tests 16).

Table 1 below illustrates various layers (such as physical, link, network, and service) that are tested for the different types of tests 12, 14, and 16. It should be noted that the profile parameters may specify any one of these tests, related data to configure or otherwise run the tests (including any WiFi or other credentials), and/or data to measure results of the tests (such as threshold values described herein). It should also be noted that appropriate configurations (such as correct OLT identifications) for the premises 11 may be included in a workflow or other information accessed at the apparatus 100 so that the apparatus 100 may validate such configurations during one or more tests. One example of such a configuration may include a configuration of an ONT 108 and OLT. In some examples, a given ONT may be provisioned specifically for a certain traffic type (e.g. Data, VOIP and Video). In these examples, different ONTs may have different configurations. The apparatus 100 may verify that an OLT serving the ONT is correctly configured for the given ONT based on the configuration of the ONT (or vice versa verify that the OLT is configured as expected, but that any error may be a result of a misconfiguration of the ONT).

matically execute the tests specified by the workflow profile). It should be noted that the term "press" as used herein is provided as an illustrative example. Other types of actuations of other types of input members may be used as well.

In some examples, the apparatus 100 may be communicably coupled to a remote apparatus 120 and a cloud platform 130. The remote apparatus 120 may be a dedicated testing device or a multi-function device such as a mobile phone, tablet, laptop, etc. The cloud platform 130 may include networked devices that communicate with the remote apparatus 120 and/or the apparatus 100 to provide networked functionality, such as storing, retrieving, and providing test results and storing, retrieving, and providing workflows. In some examples, the apparatus 100, though independently operable of the remote apparatus 120, may be configured as a companion device to the remote apparatus 120. In this sense, the apparatus 100 may itself be considered a testing instrument. In some examples, the apparatus 100 may upload test results to the remote apparatus 120 and/or the cloud platform 130. In some examples, the apparatus 100 may download workflows from the remote apparatus 120 and/or the cloud platform 130.

Figure 1B:
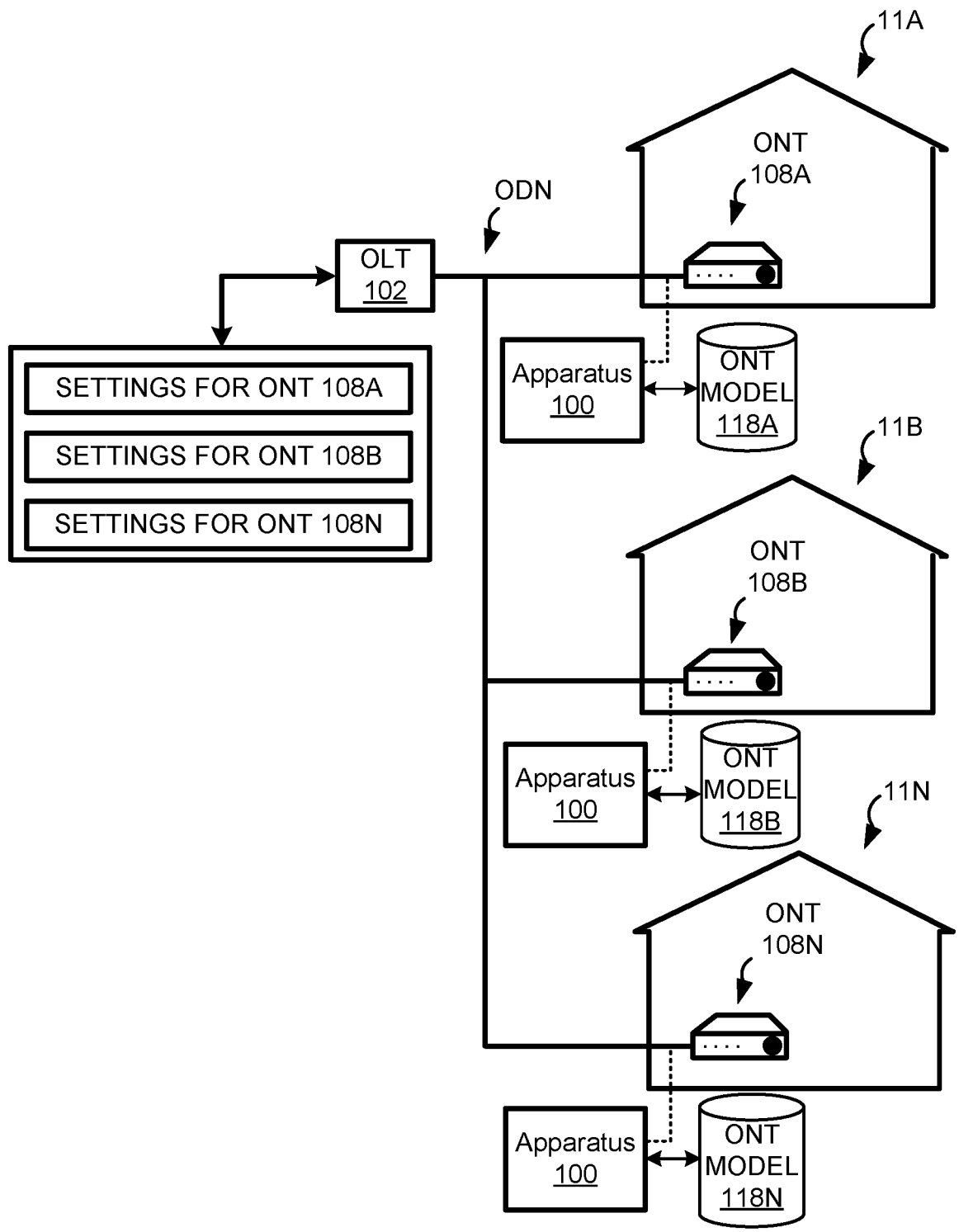
FIG. 1B is a schematic diagram of a network and service environment in which different premises use different ONTs, according to an example.

FIG. 1B is a schematic diagram of a network and service environment 10 in which different premises 11A-N use

TABLE 1

Various data, measurements, or other conditions used to obtain results of the tests are listed in brackets ("[ ]"). For example, broadband performance may be gauged based on a speed test measurement obtained while conducting a speed test.

|  | PON | Ethernet | WiFi |
| --- | --- | --- | --- |
| Service | Broadband Performance Profile correct? [Speed test measurement] | Broadband Performance Profile correct? [Speed test measurement] | Broadband Performance Profile correct? [Speed test measurement] |
| Network | Getting an IP address? Authentication access? [PPPoE, DHCP] | Getting an IP address? Authentication access? [PPPoE, DHCP] | Getting an IP address? Authentication access? [PPPoE, DHCP] |
| Link | Connected to the correct PON branch? Connected to the correct OLT? [OLT ID, PON ID] | Ethernet Traffic? [Ethernet traffic LEDs] | Connected to the correct WiFi network? Correct WiFi settings? [BSSID, Security, Band] |
| Physical | Enough Light [Optical power levels] | Ethernet Signal? [Ethernet Traffic LEDs] | Enough WiFi Coverage in each room? [Wifi Signal Strength] |

In some examples, some or all of the optical tests 12, Ethernet tests 14, and/or WiFi tests 16 may be encoded in and automatically executed based on programmable workflows stored at the apparatus 100. In this manner, the apparatus 100 may be pre-programmed with programmable workflows to automate some or all testing. As will be described later, such automated workflow-based testing may be initiated based on actuation of an input member (also referred to as an "input" interchangeably throughout) of the apparatus 100. In some examples, a single button press on the apparatus 100 may initiate the automated workflow-based testing. Thus, one-touch workflow initiation for executing one or more tests may be achieved. In some examples, different workflows may be prestored at the apparatus 100 and a specific workflow profile to be executed may be initiated based on profile actuation of the input member. For example, the apparatus 100 may scroll through the plurality of workflow profiles as an input member is actuated. During the scrolling, the apparatus 100 may receive a selection of a workflow profile to be executed among a plurality of pre-stored workflow profiles and automatically execute the selected workflow profile (i.e., autodifferent ONTs 108A-N, according to an. In some examples, different ONTs 108A-N may be manufactured by different vendors (1-N) but have different versions, models, hardware configurations, soft configurations, authentication information, and/or other ONT information. In some examples, some or all of the ONTs 108A-N may be manufactured by the same vendor but with different versions, models, hardware configurations, soft configurations, authentication information, and/or other ONT information that may be used by the apparatus 100 to emulate an ONT. As illustrated, the OLT 102 may be configured to operate with a given one of the ONTs 108A-N through an Optical Data Network (ODN). For example, the OLT 102 may be configured with the hardware configurations, soft configurations, authentication, and/or other ONT information specific to a given ONT 108 to which the OLT 102 is connected. Thus, the OLT 102 may expect certain hardware configurations, soft configurations, authentication, and/or other ONT information specific to the ONT 108 to which the OLT 102 is connected.

In some examples, the apparatus 100 may access ONT models 118A-N to emulate various ones of the ONTs 108A-N so that the apparatus 100 may connect to the OLT 102 (as shown in dotted lines) in place of the various ones of the ONTs 108A-N. An ONT model 118 may refer to a description of a corresponding ONT 108 as configured for communication with OLT 102. Each ONT model 118A-N may include the ONT information for a corresponding ONT 108. For example, ONT model 118A may include the hardware configuration, soft configuration, authentication information, and/or other ONT information associated with the ONT 108A. Likewise, ONT model 118B may include the hardware configuration, soft configuration, authentication information, and/or other ONT information associated with the ONT 108B, and so on. In some of these examples, the apparatus 100 may use an ONT model 118 to emulate a given ONT 108 in a manner that the OLT 102 operates as if the OLT 102 is connected to the ONT 108. In other words, the OLT 102 may not even be aware that the OLT 102 is connected to the apparatus 100 and not the ONT 108. As such, the OLT 102 may not need to be reconfigured to operate with the apparatus 100. Further details of ONT emulation will be described with respect to FIGS. 3A, 3B, and 6. After such connection to the OLT 102, the apparatus 100 may conduct various service tests described herein associated with the ONT 108 since the apparatus 100 has been connected to the OLT 102 in place of the ONT 108.

Figure 2A:
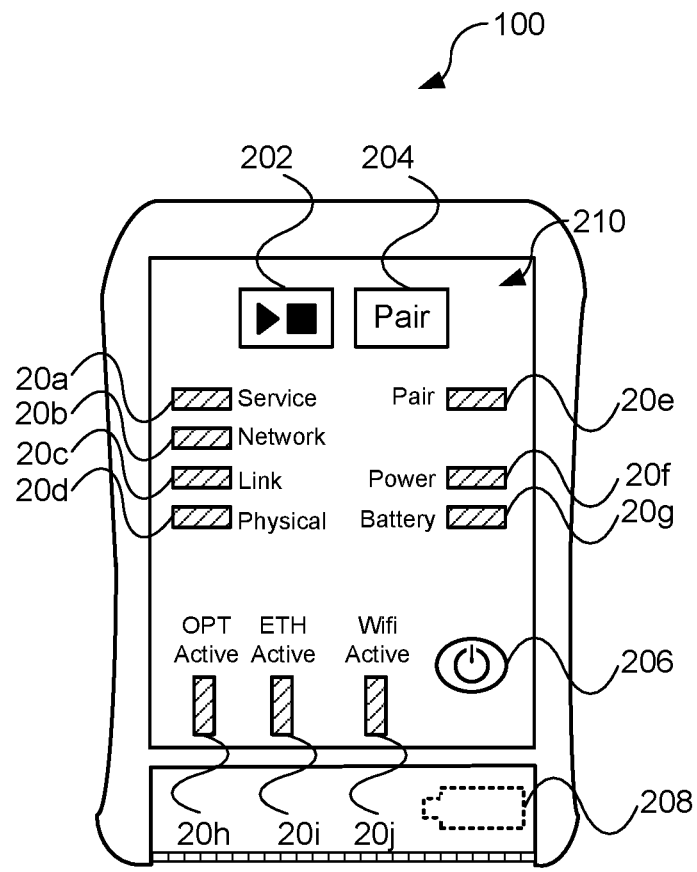
FIG. 2A illustrates a top-down view of an apparatus for emulating different ONTs and testing network services in the network and service environment, according to an example.
Figure 2B:
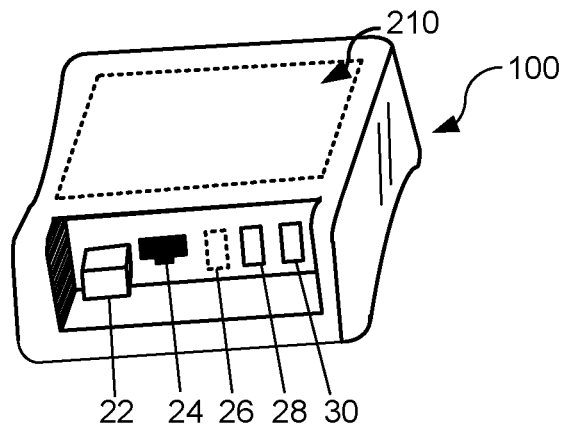
FIG. 2B illustrates a perspective view of apparatus for emulating different ONTs and testing network services in the network and service environment, according to an example.

Having described an overview of the network and service environment 10, attention will now turn to a description of the apparatus 100 with reference to FIGS. 2A, 2B, 3A, and 3B. FIG. 2A illustrates a top-down view of an apparatus 100 for testing network services in the network and service environment 10. FIG. 2B illustrates a perspective view of apparatus 100 for testing network services in the network and service environment 10. It should be noted that the appearance of the apparatus 100 and arrangement and number of features of the apparatus 100 are shown for illustrative purposes only. Other appearances and number/arrangement of the features may be used as well.

The apparatus 100 may include various input members such as input members 202, 204, and 206. Each of the input members 202, 204, 206 may include a hardware input member such as a button or other type of mechanical input. In other examples, each of the input members 202, 204, 206 may include a software input member, such as one displayed on a touch screen for examples in which the apparatus 100 includes a touch screen input device (not illustrated). Input member 202 may include a "Play" button that, when pressed, may initiate a test operation (such as from a test 12, 14, and/or 16). Input member 204 may include a "Pair" button that, when pressed, may initiate pairing with another device, such as remote apparatus 120. Such pairing may be accomplished via a device-to-device protocol such as the Bluetooth™ protocol. Input member 206 may include a power button that, when pressed, may power on or off the apparatus 100. It should be noted that although buttons are illustrated, other types of input members such as switches and other mechanical inputs, may be used.

Furthermore, although mechanical input members may be used to reduce complexity and cost of the apparatus 100, software-based input members including those based on touch/capacitive screens may be used.

In some examples, the apparatus 100 may include a power supply 208 such as a battery, which may be removable. Accordingly, the apparatus 100 in these examples may generally be portable to perform test operations throughout and outside the customer premises 11.

The apparatus 100 may include various user interface (UI) indicators 20 (illustrated as UI illustrated as UI indicators 20a-f). Each UI indicator 20 may include a Light Emitting Diode (LED) or other type of visual indicator to provide an indication of a state of the apparatus 100. For example, the UI indicator 20a may indicate a service layer test state. The UI indicator 20b may indicate a network layer test state. The UI indicator 20c may indicate a link layer test state. The UI indicator 20d may indicate a physical layer test state. The UI indicator 20e may indicate paired connection state. The UI indicator 20f may indicate power on/off/sleep state. The UI indicator 20g may indicate a battery level state. The UI indicator 20h may indicate OPT active (fiber optic interface) state. The UI indicator 20i may indicate an Ethernet active (Ethernet interface) state. The UI indicator 20j may indicate a WiFi active (WiFi interface) state. Each of the UI indicators 20 may be displayed differently to convey different information or states. Such differential display may include different colors, flashing, etc. Thus, as used herein, any one of the UI indicators 20 may be activated to indicate a particular state (such as test result, test progress, and other state) or other information to be conveyed to a user of the apparatus 100. In some instances, the apparatus 100 may activate combinations UI indicators 20 to indicate a state. For example, three UI indicators 20 may be activated to remain on to indicate a first state. In another example, three UI indicators 20 may be activated to blink to indicate a second (different) state. The apparatus 100 may activate other numbers of UI indicators 20 to indicate various states as well.

The apparatus 100 may include various communication interfaces to connect to different types of links. For instance, the apparatus 100 may include a fiber optic interface 22 (such as a Small Form-factor Pluggable (SFP) transceiver) to connect to the fiber optic cable 105, an Ethernet interface 24 (such as an Ethernet port) to connect to the electrical cable 107, a WiFi interface 26 (such as a Wireless Fidelity (WiFi) interface) to connect to a wireless signal from the router 110 and/or repeaters 112, and a wired device interface 28 (such as a Universal Serial Bus (USB) port) to connect with other devices such as testing apparatus 120. In some examples, the apparatus 100 may include a charging port 30 for charging the power supply 208. The charging port may include a USB port. It should be noted that the perspective view of FIG. 2B omits details of portion 210 for illustrative clarity; the details of portion 210 are illustrated in FIG. 2A.

Figure 3A:
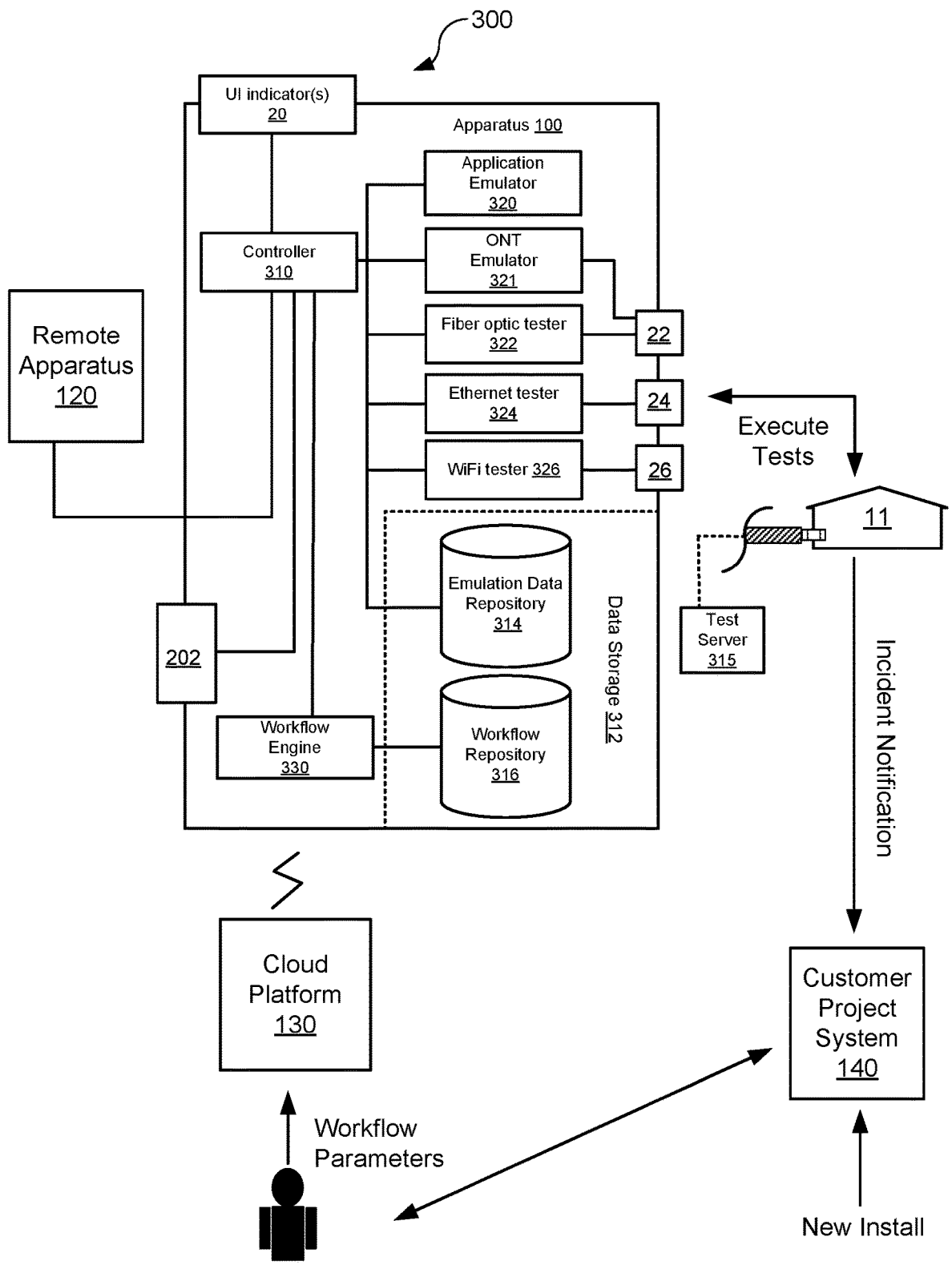
FIG. 3A illustrates a block diagram of an apparatus for emulating different ONTs and testing network services in the network and service environment, according to an example.
Figure 3B:
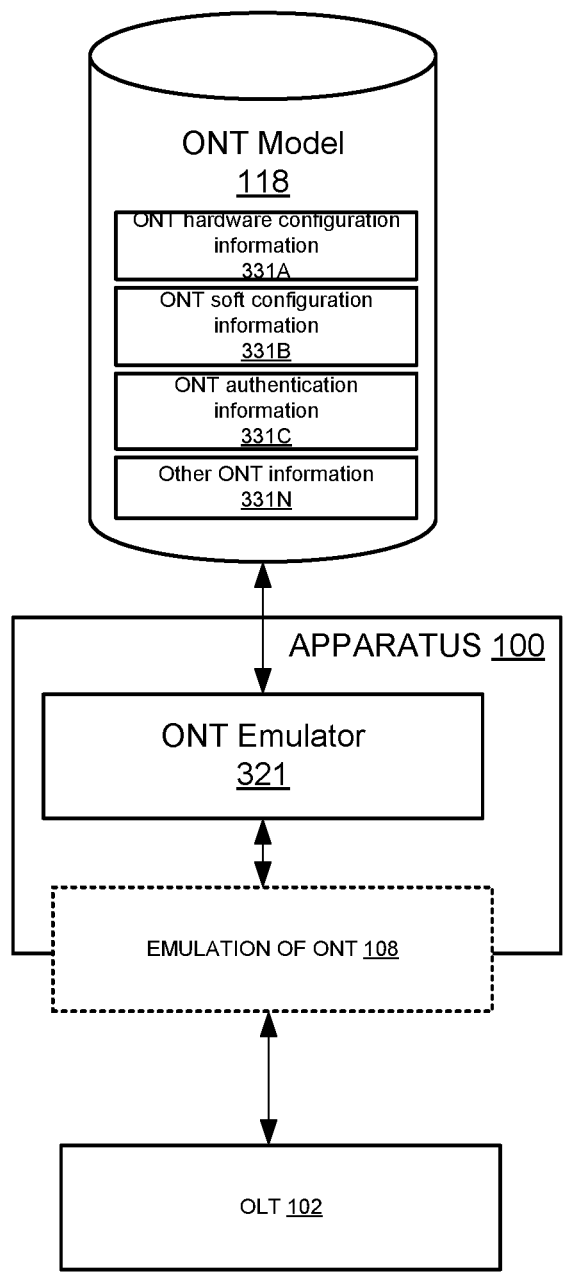
FIG. 3B illustrates another block diagram of an apparatus for emulating different ONTs and testing network services in the network and service environment, according to an example.

Referring now to FIG. 3A, the apparatus 100 may be a generally portable computing device such as a handheld test instrument having circuitry and data storage for conducting the tests described herein. For example, the apparatus 100 may include a controller 310, a data storage 312, an application emulator 320, an ONT emulator 321, a fiber optic tester 322, an Ethernet tester 324, a WiFi tester 326, a workflow engine 330, and/or other features (including one or more of the features described with respect to FIGS. 2A and 2B). Each of the controller 310, application emulator 320, ONT emulator 321, fiber optic tester 322, Ethernet tester 324, WiFi tester 326, and workflow engine 330 may include a hardware processor or other known types of control circuitry, including field programmable gate arrays, etc., for performing the operations and functions described herein. Each of the controller 310, the application emulator 320, ONT emulator 321, the fiber optic tester 322, the Ethernet tester 324, the WiFi tester 326, and the workflow engine 330 may include a processor that may control operations of the apparatus 100. The processor may be a semiconductor-based microprocessor, a central processing unit (CPU), an application specific integrated circuit (ASIC), a field-programmable gate array (FPGA), and/or other suitable hardware device.

It should be noted that each of the foregoing may be integrated with one another. For example, the controller 310 may be integrated with the application emulator 320, ONT emulator 321, fiber optic tester 322, Ethernet tester 324, WiFi tester 326, and/or the workflow engine 330. The data storage 312 may include memory or any suitable computer readable storage medium for storing data and/or machine-readable instructions used by the apparatus 100. For example, the data storage 312 may store an emulation data repository 314 and a workflow repository 316. The data storage 312 may be an electrical, magnetic, optical, or other physical storage device that includes or stores executable instructions. The data storage 312 may be, for example, Random Access memory (RAM), an Electrically Erasable Programmable Read-Only Memory (EEPROM), a storage device, an optical disc, and the like. The data storage 312 may be a non-transitory machine-readable storage medium, where the term "non-transitory" does not encompass transitory propagating signals.

The emulation data repository 314 may store ONT models 118 (illustrated at FIG. 1B) for emulating ONTs, test data for emulating services (such as video, voice, and other data services) that may be used by devices on the customer premises 11, and/or other information. The workflow repository 316 may store workflow profiles that each specify one or more optical tests 12 to be performed outside or inside premises 11.

ONT Emulation

The ONT emulator 321 may emulate a given ONT 108 based on ONT information that may be specific for the given ONT 108. For example, referring to FIG. 3B, the ONT emulator 321 may access an ONT model 118 to emulate a given ONT 108 (in other words, generate an emulation of the ONT 108).

The ONT model 118 may include ONT hardware information 331A, ONT soft configuration information 331B, ONT authentication information 331C, and/or other ONT information 331N. In effect, the ONT model 118 may include the various ONT settings (illustrated in FIG. 1B) used by the OLT 102 to work with or otherwise communicate with a given ONT 108. For example, the ONT model 118A may include the settings for ONT 108A. The ONT model 118B may include the settings for ONT 108B, and so forth. Thus, the ONT settings may be used by the OLT 102 in communications with a corresponding ONT 108 while the ONT model 118A may be used by the apparatus 100 to emulate the corresponding ONT 108.

The ONT hardware configuration information 331A may include information that specifies hardware of an ONT 108, such as a manufacturer name, hardware model (as in a specific device model as opposed to an ONT model), hardware revision, hardware configuration, and/or other hardware information of the ONT 108. The hardware configuration may specify a number and type of ports of the ONT 108. To emulate the ONT 108, the ONT emulator 321 may provide the OLT 102 with the hardware configuration, whether or not the apparatus 100 is not configured with such hardware. For example, if the ONT 108 has four Ethernet network ports and two plain old telephone service (POTS) ports, and the OLT 102 is configured to recognize that the ONT 108 has four Ethernet network and two POTS ports, then the ONT emulator 321 may provide the OLT 102 with information indicating that four Ethernet network ports and two POTS ports are present. It should be noted that any Ethernet tests by the apparatus 100 as described herein may be conducted through the Ethernet port that the apparatus 100 actually does have. In another example, the ONT 108 may use Virtual Ethernet Interface Port (VEIP) modeling and the apparatus 100 may model this configuration instead of standard bridge modeling. In this manner, the OLT 102 may operate with the apparatus 100 without reconfiguration. In some examples, the ONT emulator 321 may communicate the hardware information and/or other information from the ONT model 118 to the OLT 102 as appropriate via the G.984 standard, which is incorporated by reference in its entirety herein.

The ONT soft configuration information 331B may include information that indicates a configuration of data settings/information, software, software revision, services such as data transmission/reception, Voice over IP (VO IP), video, POTS, and/or other types of services offered by a service provider through the OLT 102 and configurations of such services, and/or other configuration information that describes data or software used by or associated with an ONT 108. For example, the soft configuration information may include an indication of a serial number or unique ONT identification that identifies the ONT 108, a registration identification that identifies a registration with the PON or OLT 102, one or more network configuration settings, a software version such as firmware or other software used at the ONT 108, port configurations (ports used), and/or other soft configuration information. To emulate the ONT 108, the ONT emulator 321 may access and provide the soft configuration information 331B to OLT 102 or otherwise use the soft configuration information when communicating with OLT 102.

The ONT authentication information 331C may include information for authentication with the OLT 102 and/or service provider network. For example, the ONT authentication information 321C may include, without limitation, password used by the ONT 108 to authenticate with the OLT 102, stored credential, serial number of the ONT device 108, registration identification/Subscriber Line Identification (SLID), logical ONU identifier (LOID), GPON 802.1x, and/or other authentication information used by the ONT 108 to authenticate with the OLT 102. To emulate the ONT 108, the ONT emulator 321 may access and provide the ONT authentication information 331C for authenticating with the OLT 102. In this manner, the OLT 102 may authenticate the apparatus 100 with the ONT authentication information 331C just as the OLT 102 may authenticate the actual ONT 108 with the ONT authentication information 331C.

It should be noted that some or all of the ONT model 118 may be specific to an individual ONT 108 (which may be identical to another ONT 108 but configured differently for a specific premises 11). For example, each individual ONT device 108 (whether or not the same model or vendor as another ONT device) may be identified by a unique ONT device identifier. In this example, a given ONT model 118 may be associated with (stored in association with) the unique ONT device identifier such that the ONT model 118 describes a specific individual ONT device 108.

In some examples, some or all of the information in the ONT model 118 may be specific to a specific model or version ONT 108 manufactured by a vendor. In these examples, the ONT model 118 may be associated with a model, version, and/or vendor identification so that the ONT model 118 is applicable to any ONT device that shares the model, version, and/or vendor identification. In some examples, some or all of the information in the ONT model 118 may be specific to a specific vendor that manufactures a given ONT 108 such that the ONT model 118 is applicable to all ONT devices 108 manufactured by that vendor. It should be further noted that a given ONT model 118 may be alternatively or additionally specific to a given service provider such that a given ONT model 118 is applicable to specific service providers. In any event, a given ONT 108 may be associated with a corresponding ONT model 118, which may include information that is used in communications with an OLT 102.

In some examples, the apparatus 100 may store the ONT model 118 at emulation data repository 314 (illustrated in FIG. 3A). The ONT model 118 and/or information included therein may be obtained by the apparatus 100 from the remote apparatus 120, the cloud platform 130, and/or other source. The system may store various ONT models 118 corresponding to ONTs 108 in the ONT model store 150. In some examples, a user may input some or all of the information of the ONT model 118 through the remote apparatus 120 or other device and the inputted information may be transmitted to the apparatus 100. In some examples, the apparatus 100 may automatically determine one or more of the ONT information included in an ONT model 118.

Once the apparatus 100 has emulated the ONT 108, the apparatus 100 (connected to the OLT 102 in place of the ONT 108), may perform various tests of the optical network, such as tests performed at the ONT 108. In some examples, the apparatus 100 may also perform various tests throughout the premises 11 as well, as described herein. It should be noted that for some of the tests, the ONT 108 may be re-installed so that the apparatus 100 (which emulated and substituted for the ONT 108) may be carried about the premises 11 for testing.

Fiber Optic Testing (PON/GPON)

Referring back to FIG. 3A, the fiber optic tester 322 may perform one or more optical tests 12 using the fiber optic interface 22 to test data communication (receive and/or transmit) via fiber optic cable 105. The optical tests 12 may include a physical layer test, a link layer test, a network layer test, and a service layer test. The optical tests 12 may be based on signals transmitted and/or received by the fiber optic tester 322.

Figure 4A:
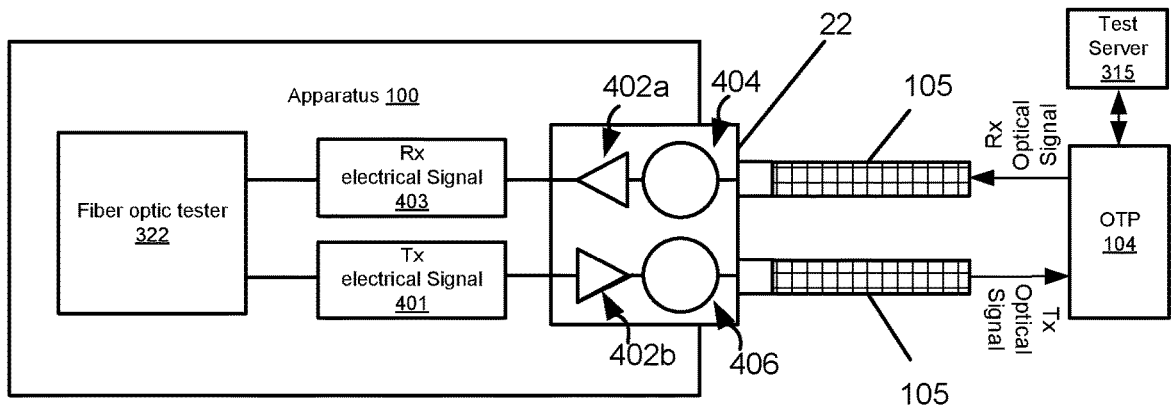
FIG. 4A illustrates a block diagram of an apparatus for testing network services over a physical optical layer, according to an example of the disclosure.

For instance, referring to FIG. 4A, the fiber optic tester 322 may transmit electrical signals (Tx electrical signal 401) and receive electrical signals (Rx electrical signal 403) via the fiber optic interface 22. The fiber optic interface 22 may include an electrical interface 402b to receive the Tx electrical signal 401 from the fiber optic tester 322 and provide the Tx electrical signal 401 to an optical emitter 406. The optical emitter 406 may include an LED, laser, or other emitter than may convert the Tx electrical signal 401 to an optical signal (Tx optical signal) based on an incoming voltage or pulse, or other property of the electrical signal. The optical emitter 406 may transmit the optical signal over the fiber optic cable 105. As illustrated, the fiber optic cable 105 may be connected to the OTP 104, which transmits the optical signal to the drop terminal 103, which in turn transmits the optical signal to the rest of the GPON. In other words, in the example illustrated, the apparatus 100 may be connected to the OTP 104 via the fiber optic cable 105. It should be noted that the apparatus 100 may be connected to the drop terminal 103 via the fiber optic cable 105 as well, enabling optical tests 12 to be performed at either of these optical points in the network and services environment 10.

The fiber optic interface 22 may include an optical detector 404 that receives an optical signal (Rx optical signal) via the fiber optic cable 105. The optical detector 404 may include a semiconductor detector such as a photodiode or photodetector, a silicon photodiode, a Germanium detector, an Indium Gallium Arsenide (InGaAs) detector, avalanche photodiodes (APDs), and/or other type of detector that can convert the optical signal into an electrical signal. The optical detector 404 may convert the optical signal into an electrical signal (Rx electrical signal 403), which may be conveyed by the fiber optic interface 402a to the fiber optic tester 322. It should be noted that the fiber optic interface 22 may operate on a single bi-directional fiber optic cable as well.

The fiber optic tester 322 may test the physical layer of data communication through the fiber optic cable 105 by obtaining the power levels of the Rx optical signal received at the detector 404. In this manner, the apparatus 100 may determine and report the power level of an optical signal from the OTP 104 and/or the drop terminal 103 (depending on which of the OTP 104 or drop terminal 103 to which the apparatus 100 is connected).

The fiber optic tester 322 may test the link layer of data communication through the fiber optic cable 105 by verifying proper GPON configuration. For example, the fiber optic tester 322 may obtain an Optical Line Terminal (OLT) identification (such as via a PON identification that identifies a port of the OLT to which the ONT is connected) and/or an ONT identification, which may be assigned by the OLT to identify the ONT), and/or other identification of a component of the GPON to which the apparatus 100 is connected (through the OTP 104, for example). The fiber optic tester 322 may verify whether the OTP 104 is connecting to the correct OLT and/or PON, and/or whether the OLT and ONT are correctly configured, such as based on predefined data relating to such configurations and identifications such as those listed in Table 1.

The fiber optic tester 322 may test the network layer of data communication through the fiber optic cable 105 by verifying that the apparatus 100 is able to obtain an IP address and authenticated access to the Internet via the fiber optic cable 105 (from the ONT 108).

The fiber optic tester 322 may test the service layer of data communication through the fiber optic cable 105 by transmitting and receiving data through the fiber optic interface 22. For instance, the fiber optic tester 322 may provide a Tx electrical signal 401 to the optical emitter 406 via the interface 402b to test upload speeds. The term upload or download speed as used herein refers to a rate at which a size of data is transferred over a network per unit time. Such speed may also be referred to as a data transfer (transmission or receipt) rate and may be expressed as, without limitation, Megabits per second (Mbps) or Gigabits per second (Gbps). The Tx electrical signal 401 may include a known size to monitor transmission rates. The Optical emitter 406 may convert the Tx electrical signal 401 to a Tx optical signal that is transmitted through the fiber optic cable 105 to, for example, the OTP 104. The OTP 104 transmits the data through the PON (or GPON) ultimately to the test server 315, which may include a speed test server that sends and receives defined sizes of data to monitor transmission rates. The test server 315 may return an acknowledgement, a time of receipt of the Tx optical signal, and/or an upload rate, which may be based on a time transmitted with the Tx optical signal. Based on the transmission from the test server 315, the fiber optic tester 322 may determine an upload speed via the Tx optical signal, such as via a connection to the OTP 104 through fiber optic cable 105. For example, the fiber optic tester 322 may calculate the upload speed based on the predefined size of the Tx electrical signal 401 and the elapsed time for the test server 315 to receive the data via the Tx optical signal or simply obtain the upload rate from the test server 315, depending on the implementation. In these examples, it should be noted that the test server 315 may include a speed test server, including third party speed test servers.

To test download speeds via the fiber optic cable 105 from the OTP 104, the test server 315 (or component of the system coupled to the test server 315) may provide an Rx optical signal across the PON with data having a known size. The fiber optic interface 22 may receive the Rx optical signal via the detector 404, which may convert the Rx optical signal into an Rx electrical signal 403 and provide the Rx electrical signal 403 to the fiber optic tester 322 via the interface 402a. The fiber optic tester 322 may determine a time of receipt and a time of transmission of the Rx electrical signal 403, and the size of data in the Rx electrical signal (in other words, the size of the data transmitted from the test server 315), to calculate a download speed achieved through the fiber optic cable 105, such as via the OTP 104. In this manner, the apparatus 100 may test service level performance (such as data communication rates) via an optical signal transmitted over a fiber optic cable 105. For example, the apparatus 100 may be connected to the OTP 104 via the fiber optic cable 105 to test speed performance through optical signals. Conventional testers may perform such testing at a router using electrical signals.

Ethernet Testing (Premises Network)

Figure 4B:
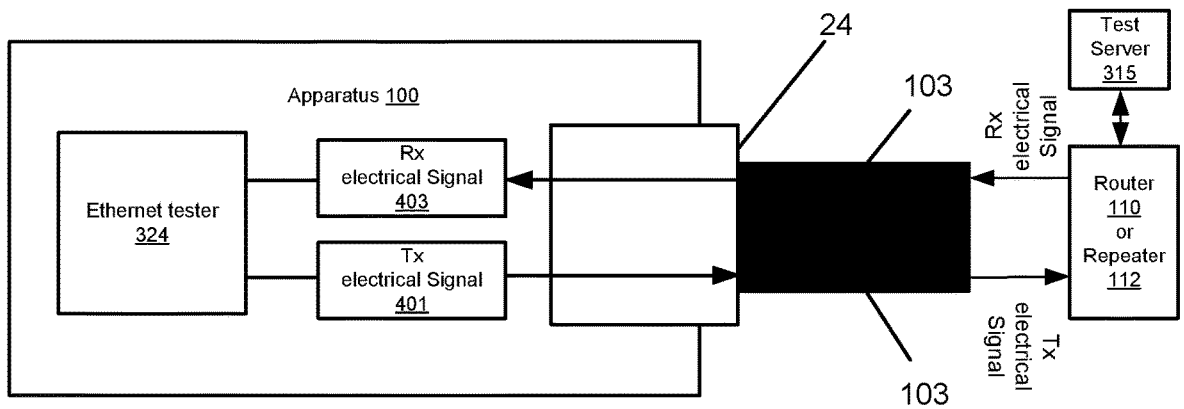
FIG. 4B illustrates a block diagram of an apparatus for testing network services over a physical Ethernet layer, according to an example of the disclosure.

Referring to FIG. 4B, the Ethernet tester 324 may perform one or more Ethernet tests 14 using the Ethernet interface 24 to test data communication (receive and/or transmit) via electrical cable 107. The Ethernet tests 14 may include a physical layer test, a link layer test, a network layer test, and a service layer test. The Ethernet tests 14 may be based on signals transmitted and/or received by the Ethernet tester 324.

The Ethernet tester 324 may perform one or more test operations 12 using the Ethernet interface 24 to electrical data transmissions via electrical cable 107.

The Ethernet tester 324 may test the physical layer of data communication through the electrical cable 107 by transmitting and/or receiving data through the Ethernet interface 24 and determining whether electrical (such as Ethernet) signals are being transmitted and/or received through the Ethernet interface 24. The presence of such signals may also be indicated through LED indicators (not illustrated) of the Ethernet interface 24.

The Ethernet tester 324 may test the link layer of data communication through the electrical cable 107 based on observed Ethernet traffic across the Ethernet interface 24, similar to the manner in which the physical layer is tested for the physical layer of Ethernet links.

The Ethernet tester 324 may test the network layer of data communication through the electrical cable 107 by verifying that the apparatus 100 is able to obtain an IP address and authenticated access to the Internet via the electrical cable 107 (from the router 110).

The Ethernet tester 324 may test the service layer of data communication through the electrical cable 107 by transmitting or receiving electrical signals similar to the manner in which the fiber optic tester 322 tests the service layer, except that the Ethernet tester 324 may operate on electrical signals (such as Ethernet signals) without converting such signals to and from optical signals since the Ethernet tester 324 may operate via electrical cable 107 connected to the router 110, for example.

Wireless Testing (Premises Network)

Figure 4C:
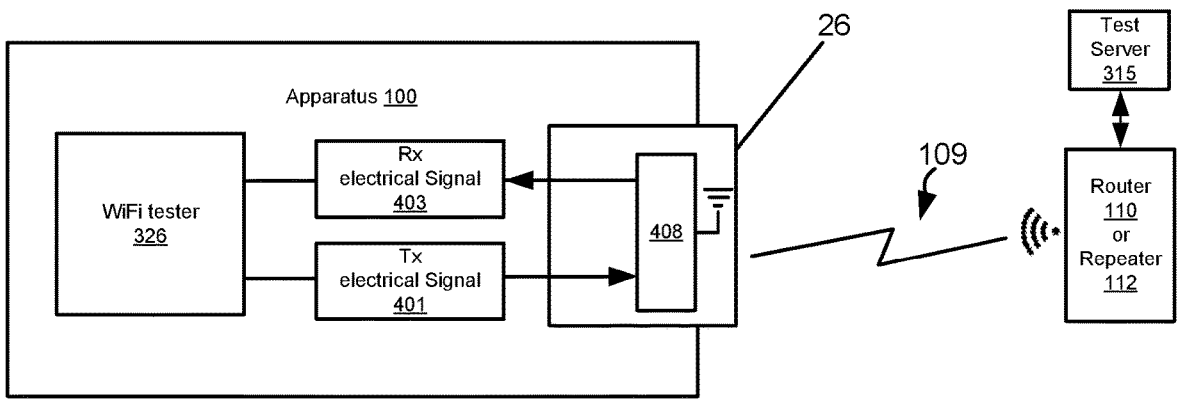
FIG. 4C illustrates a block diagram of an apparatus for testing network services over a physical WiFi layer, according to an example of the disclosure.

Referring to FIG. 4C, the WiFi tester 326 may perform one or more WiFi tests 16 using the WiFi interface 26 to test data communication (receive and/or transmit) via a wireless transceiver 408 through a wireless link 109. For example, the wireless transceiver may convert Tx electrical signals 201 from the WiFi tester 326 to outgoing wireless signals and convert incoming wireless signals into Rx electrical signals for the Ethernet tester 324. The WiFi 16 may include a physical layer test, a link layer test, a network layer test, and a service layer test. The WiFi tests 16 may be based on signals transmitted and/or received by the WiFi tester 326.

The WiFi tester 326 may test the physical layer of data communication through the wireless link 109 by measuring a wireless signal strength of the wireless link 109. The measurement may be performed for each of various frequencies, such as 2.4 Ghz and 5.0 Ghz frequencies.

The WiFi tester 326 may test the link layer of data communication through the wireless link 109 by determining whether the apparatus is connected to the proper wireless network (such as the correct router by verifying the BSSID of the router 110 to which the WiFi tester 326 is connected is the correct BSSID), verifying that the proper settings are used (such as the correct security profile/type, password, correct band, etc.), and/or verifying other wireless settings.

The WiFi tester 326 may test the network layer of data communication through the wireless link 109 by verifying that the apparatus 100 is able to obtain an IP address and authenticated access to the Internet via the wireless link 109 (from the router 110 and/or or a repeater 112).

The WiFi tester 326 may test the service layer of data communication through the wireless link 109 by transmitting or receiving electrical signals similar to the manner in which the fiber optic tester 322 tests the service layer, except that the WiFi tester 326 may operate on wireless signals without converting such signals to and from optical signals since the wireless tester 324 may operate via wireless link 109 through the router 110 and/or a repeater 112, for example.

It should be noted for the foregoing tests that require verification, the apparatus 100 may access the correct settings (such as the correct PON identification, correct BSSID, etc.) be facilitated by accessing the correct settings that should be used and comparing such settings to those observed by the apparatus 100 during testing.

Application Service Emulation Testing

Any of the foregoing layers and links may be tested further based on emulated application layer data. For example, the application emulator 320 may emulate various types of data or voice services by transmitting and receiving data configured as video, voice, and other types of data for services that may be used at the network and service environment 10. In one example, the application emulator 320 may simulate voice over IP services, streaming video services, standard voice services, and/or other data or voice services by transmitting and receiving emulation data that simulates these services. The emulation data may be pre-stored in the emulation data repository 314 or may be configurable such as by downloading the emulation data, such as from the cloud platform 130 and/or testing apparatus 120. In these examples, the emulation data from the application emulator 320 may be provided to the fiber optic tester 322, the Ethernet tester 324, and/or the WiFi tester 326 to test the emulated services over different physical layers and/or communication links. In some examples, the application emulator 320 may transmit the emulation data via one or more application layer protocols such as SNMP, HTTP, FTP, and/or others. For example, the application emulator 320 may perform emulated testing of web servers or other network services by testing web server response times, latency, and/or other performance characteristic of a web server.

Manual Test Selection and Execution

In some examples, the various optical tests 12, Ethernet tests 14, and WiFi tests 16 (including any of each of their sub-tests for the physical, link, network, and service layers) may be selected and executed based on input from a technician. For example, in operation, the technician may connect the fiber optic interface 22 of the apparatus 100 to the drop terminal 103 or the OTP 104 via a fiber optic cable 105. The technician may press the input member 202 to cycle through the various testing options. It should be noted that other input members (not shown) may be provided to perform such scrolling operation as well. As the technician scrolls through the test options an appropriate UI indicator 20 may indicate that the test is ready to be executed. For example, the Service indicator (UI indicator 20a) may indicate that a service layer test is ready, the Network indicator (UI indicator 20b) may indicate that a network layer test is ready, the Link indicator (UI indicator 20c) may indicate that a link layer test is ready, and the Physical indicator (UI indicator 20d) may indicate that a physical layer test is ready.

In some instances, the OPT active indicator (UI indicator 20h) may indicate that the optical tests 12 are ready when the apparatus 100 is connected to an fiber optic cable 105 through the fiber optic interface 22, the ETH indicator (UI indicator 20i) may indicate that the Ethernet tests 14 are ready when the apparatus 100 is connected to an electrical cable 107 through the Ethernet interface 24, and the WiFi Active indicator (UI indicator 20j) may indicate that the WiFi tests 16 are ready when the apparatus 100 is connected to a wireless link 109 through the WiFi interface 26. Alternatively, the optical tests 12, Ethernet tests 14, and/or WiFi tests 16 may be scrolled in a manner similar to scrolling the different layer tests to select an appropriate test for execution.

To select a test after scrolling, the technician may hard press (press the input member 202) for a predefined period of time or otherwise press another input member.

In this manner, and because the apparatus 100 may be portable, a technician may carry the apparatus 100 throughout and outside the customer premises 11 to test various links (including optical and electrical) and devices.

Workflow-Based Test Selection and Execution

In some examples, the apparatus 100 may be pre-loaded with one or more workflow profiles. A workflow profile may include a plurality of workflow parameters that specify a test to be executed and/or data used for the test. For example, a workflow parameter may include a virtual logical area network setting, a test indicator that identifies a tests is to be performed (such as a ping test, service layer test such as a speed test, a physical layer test, a link layer test, a network layer test), a threshold value for determining whether the service performance test to be performed passes or fails, data for executing the test such as a WiFi credential, and/or other data. The apparatus 100 may use a workflow profile to identify and execute the tests. For example, each test may be coded with an identification the controller 310 (such as via the workflow engine 330) uses to identify the test. Such identification may be indicated in the workflow profile. In some instances, once a workflow profile is selected, the apparatus 100 may automatically initiate the tests specified by the workflow parameters. The tests may include the optical tests 12, the Ethernet tests 14, and/or the WiFi tests 16 (including any of each of their sub-tests for the physical, link, network, and service layers). When more than one test is to be executed, the workflow profile may specify an order in which to execute the tests.

The apparatus 100 may receive a workflow profile from a remote device (a device that is separate from and independently operable of the apparatus 100). For example, the apparatus 100 may receive the workflow profile from a remote device 120 (such as remote apparatus 120, cloud platform 130) via any one of the various interfaces 22, 24, 26, 28 via WiFi interface 26, and/or other device. For example, a user may select or design a workflow profile for uploading to the apparatus 100. Such selection or design may be customized for a particular customer project to resolve an issue or install new service at premises 11. As such, a workflow profile may be a general workflow profile or may be customized for a particular set of tests, such as a specific set of tests for a given premises 11 to service a particular customer project associated with the customer premises 11. Once a workflow profile is received, the apparatus 100 may store the workflow profile in the workflow repository 316.

When onsite at or near the customer premises 11, a technician may select a workflow profile, which may cause the apparatus 100 to automatically execute the workflow profile (in other words, run the one or more tests identified in the workflow profile). In some examples, the workflow profile may include predefined configurations (such as appropriate OLT identification and/or other configuration information, examples of which are illustrated in Table 1). In these examples, some or all of the predefined configurations may be displayed in the test results. In some examples, the predefined configurations may be downloaded to the apparatus 100. In some examples, the apparatus may detect and upload the configurations of the various devices and connections of the premises 11.

In some examples, the apparatus 100 may include a one-touch workflow profile execution. In these examples, the apparatus 100 may receive a press of the input member 202 and execute the tests of the workflow profile. These examples may be beneficial when a single workflow profile is used and facilitates ease of operation. In other examples, the apparatus 100 may permit scrolling through and selecting a plurality of workflow profiles, similar to the manner in which individual tests are scrolled.

During execution of a workflow profile, the apparatus 100 may provide indications of a next test to be executed. For example, the apparatus 100 may activate one or more appropriate UI indicators 20. To illustrate, if an Ethernet test 14 is to be performed, the ETH active (UI indicator 20i) may be activated to indicate that the Ethernet test 14 should be tested next. This prompts the technician to connect the apparatus to the router 110 or other device through which the Ethernet test 14 may be executed. In some examples, the apparatus 100 may provide indications of testing status. For instance, the apparatus 100 may activate one or more UI indicators 20 to indicate the current test being executed. It should be understood that the UI indicators 20 may be activated differently depending on context. For example, a flashing indication may signal the technician to proceed to a next test, while a yellow indication may signal that a test is currently in progress. Other types of indications may be used as well depending on the context/state of the apparatus 100.

Block diagram 300 is a simplified block diagram showing only the blocks relevant for the methods described herein. Block elements not relevant for the methods described herein are not shown, including but not limited to functional elements such as equalizers, lasers, photo receivers, wavelength multiplexers, etc.

Figure 5:
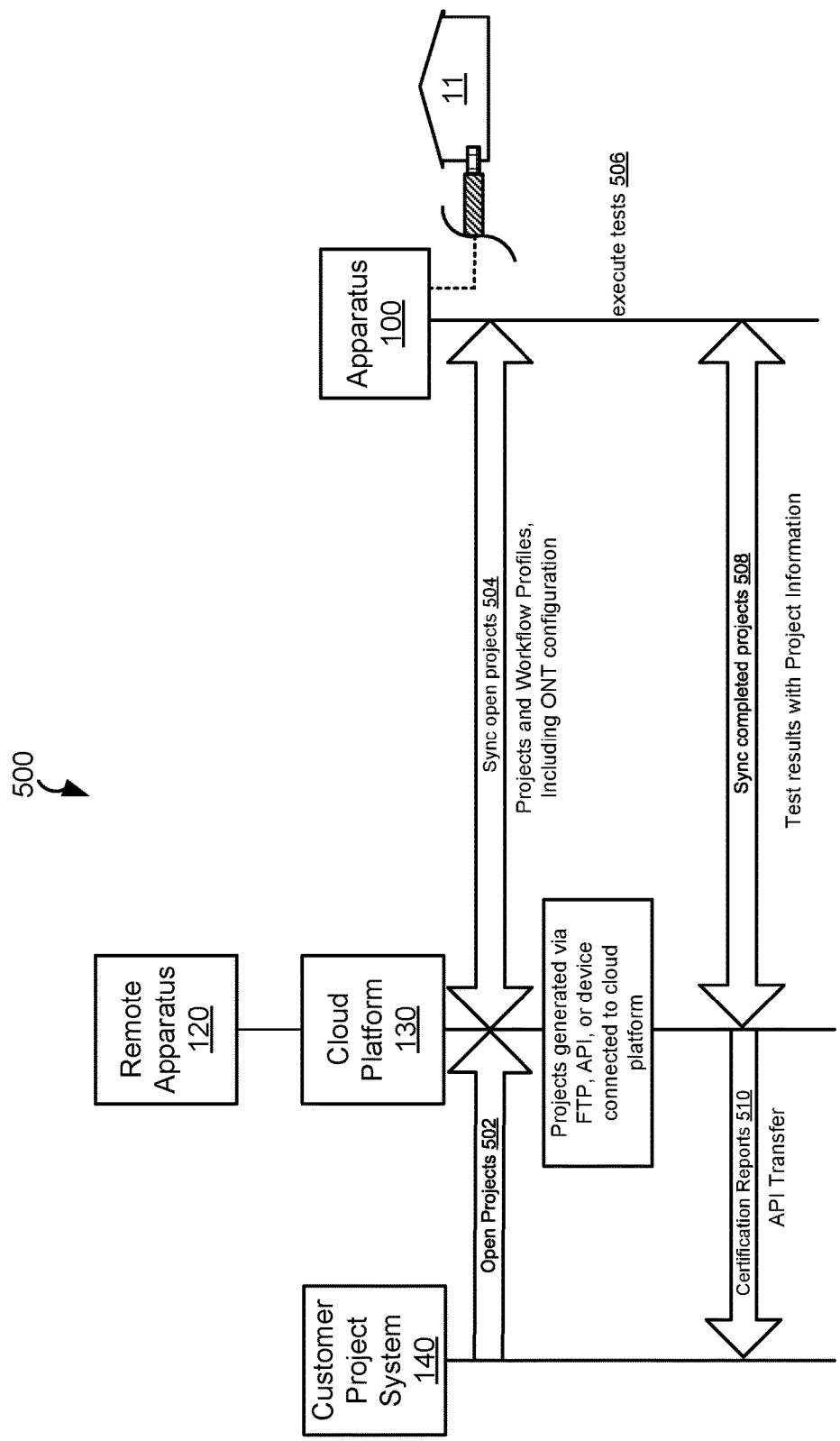
FIG. 5 is a schematic diagram of workflow integration with an apparatus for emulating different ONTs and testing network services in the network and service environment, according to an example.

FIG. 5 is a schematic diagram 500 of workflow integration with an apparatus for testing network services in the network and service environment, according to an example.

At 502, a project may be opened. The project may originate from the customer project system 140 to install service a new customer (such as a new install) or service an existing customer (such as to troubleshoot a problem) at premises 11. In some examples, a workflow profile may be generated or otherwise identified to address the project. For example, a user may use the remote apparatus 120 to specify a set of tests to confirm that new service is working as expected or may include a set of tests to be able to troubleshoot a problem. In either instance, the remote apparatus 120 may generate a workflow profile based on the set of tests, which may include one or more optical tests 12, one or more Ethernet tests 14, and/or one or more WiFi tests 16 be conducted. The workflow profile may be custom-generated for the specific problem, based on a preconfigured template, or be a standard workflow profile that is predefined. The remote apparatus 120 may share the project and/or the workflow profile via the cloud platform 170.

At 504, the cloud platform 170 may provide the project and/or the workflow profile to the apparatus 100. As such, the apparatus 100 may be pre-loaded with the project and/or the workflow profile. At 506, the apparatus 100 may execute the tests from the workflow profile. For example, a technician may use the apparatus 100 to execute the workflow profile as described herein.

At 508, the apparatus 100 may synchronize completed projects with the cloud platform 170. For example, the apparatus 100 may upload the results of testing for each project to the cloud platform 170. At 510, the cloud platform 170 may provide certification reports (such as test results and problem resolution) to the customer project system 140. In this manner, an end-to-end problem to test design and resolution may be facilitated. In some examples, the cloud platform 170 may provide the test results to remote apparatus 120. In some examples, as previously noted, the apparatus 100 may share the test results directly with the remote apparatus 120.

Figure 6:
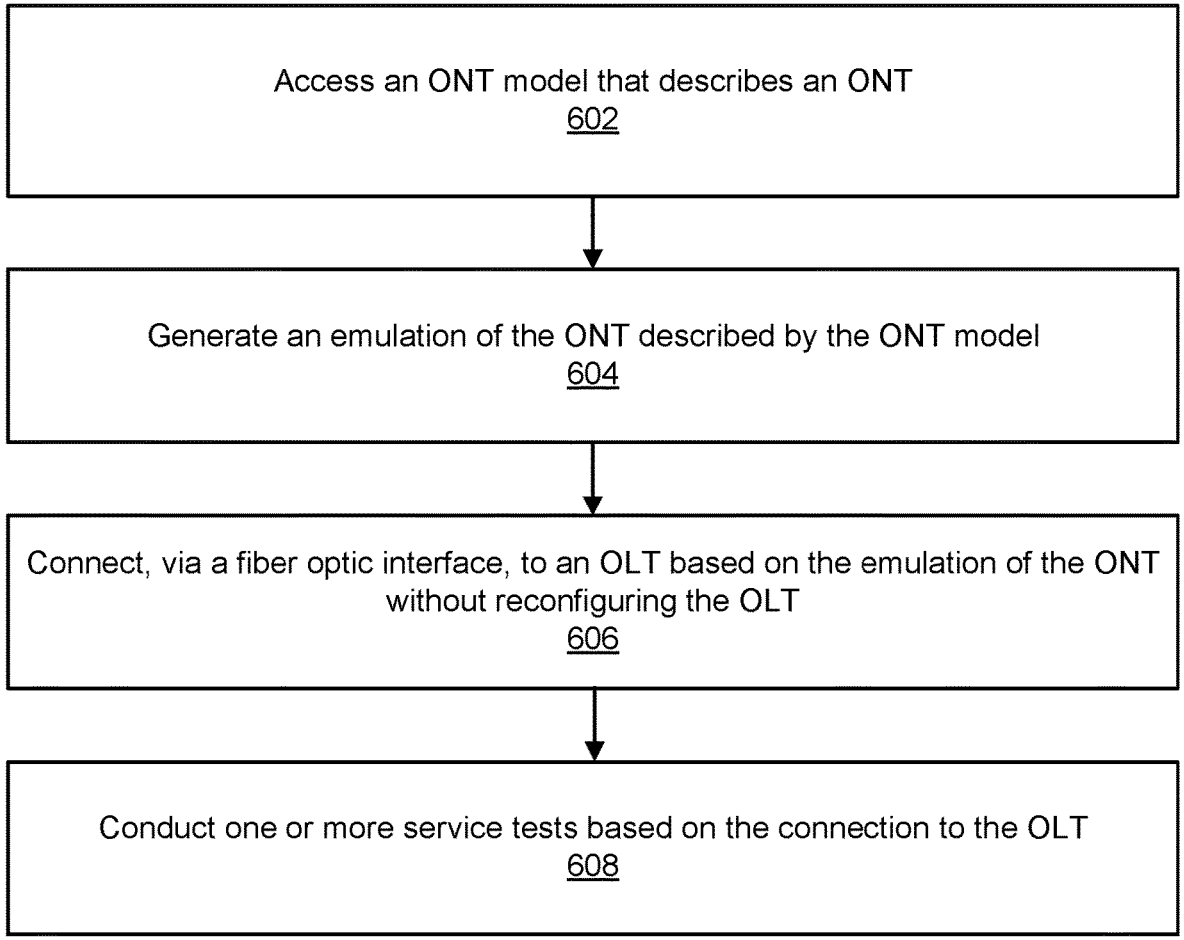
FIG. 6 illustrates a method of emulating different ONTs for testing service performance, according to an example.

FIG. 6 illustrates a method 600 of emulating different ONTs for testing service performance, according to an example. It should be understood that the method 600 may include additional operations and that some of the operations described therein may be removed and/or modified without departing from the scopes of the method 600. The description of the method 600 may be made with reference to the features depicted previous figures for purposes of illustration.

At 602, a test instrument (such as the apparatus 100) may access an ONT model that describes an ONT (such as an ONT 108). The test instrument may store the ONT model via onboard data storage (such as data storage 312). The ONT model may include ONT authentication information, ONT hardware configuration information, ONT soft configuration, and/or other ONT information that describes the ONT.

At 604, the test instrument may generate an emulation of the ONT based on the ONT model. For example, the test instrument may copy the ONT authentication information, ONT hardware configuration information, ONT soft configuration, and/or other ONT information that describes the ONT for use with the OLT.

At 606, the test instrument may connect to the OLT via the fiber optic interface based on the emulation of the ONT without reconfiguration of the OLT to work with the test instrument. In some examples, the test instrument may provide the ONT authentication information to authenticate the test instrument with the OLT.

In some examples, the test instrument may transmit at least some of the ONT hardware configuration information to the OLT. In some of these examples, the ONT hardware configuration information specifies hardware that the ONT includes but that the test instrument does not include. To illustrate, an ONT may include an optical port, two phone ports, and two Ethernet ports. However, the test instrument may include a different number and/or combination of these ports. The test instrument may nevertheless report to the OLT that these ports are available so that the OLT may not require reconfiguration to operate with the test instrument.

In some examples, the test instrument may use at least some of the ONT soft configuration information for the connection to the OLT. For example, the test instrument may configure network communication packets based on the ONT soft configuration information.

At 608, the test instrument may perform one or more service tests based on the connection to the OLT. In some examples, the test instrument may perform a service test originating from a location at which the ONT is installed at a premises (such as premises 11). In these examples, the test instrument may conduct one or more tests at the connection point of the ONT to the OLT, such as a measurement of light levels that would be received at the ONT or other service tests of service levels that would be received at the ONT. In some examples, the test instrument may perform a service test originating from a location other than where the ONT is installed at a premises. For example, the test instrument may be disconnected, and the ONT may be reconnected. The test instrument may be carried to locations at the premises other than where the ONT is located to perform the service test.

Figure 7:
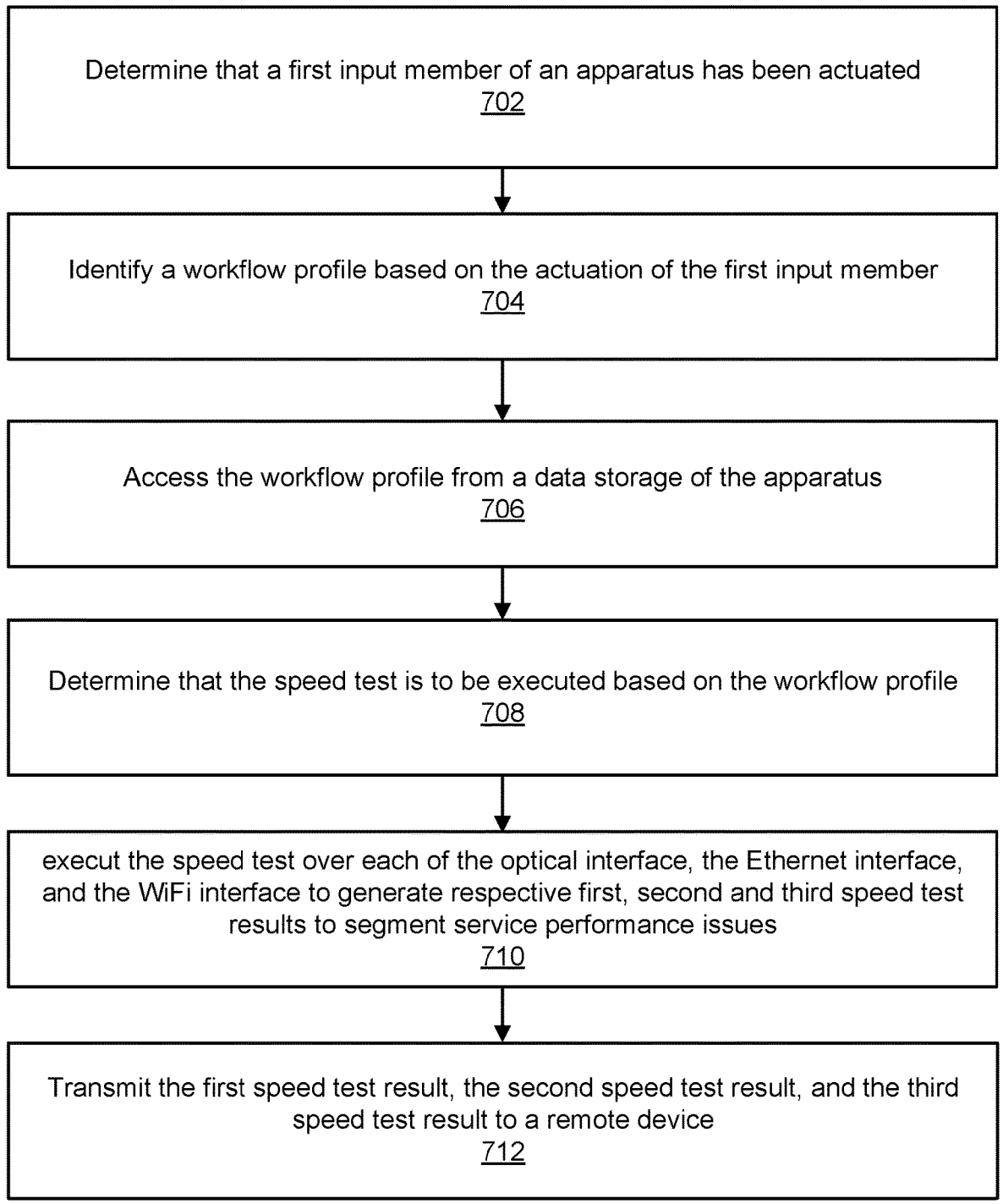
FIG. 7 illustrates a method of segmenting service performance issues based on tests specified in workflow profiles, according to an example.

FIG. 7 illustrates a method 700 of segmenting service performance issues based on tests specified in workflow profiles, according to an example. It should be understood that the method 700 may include additional operations and that some of the operations described therein may be removed and/or modified without departing from the scopes of the method 700. The description of the method 700 may be made with reference to the features depicted previous figures for purposes of illustration.

At 702, the apparatus 100 may determine that the first input member has been actuated. For example, a technician may have pressed a play button, such as the input member 202 illustrated in FIG. 2A.

At 704, the apparatus 100 may identify a workflow profile based on the actuation of the first input member. For example, the workflow profile may have been previously assigned to an actuation of the play button (such as input member 202) such that pressing the play button may initiate execution of the workflow profile. In some instances, such initiation may be based on a one-touch operation such that a single press of the first input member initiates execution of the workflow profile. In some instances, such initiation may be based on a combination a user inputs such as a long press (press-and-hold for predetermined period of time) the first input member followed by an actuation of a second input member initiates execution of a second workflow profile. Thus, different workflows may be initiated based on single presses and/or combination of presses of different input members.

At 706, the apparatus 100 may access the workflow profile from the data storage, such as the data storage 312. In a specific example, the workflow profile may be accessed from a workflow repository 316. The apparatus 100 may have previously received and stored the workflow profile for automated test execution.

At 708, the apparatus 100 may determine that the speed test is to be executed based on the workflow profile. The workflow profile may include a workflow parameter that specifies the speed test is to be executed. The workflow profile may include further parameters used to execute the speed test, such as a network address of a test server with which the apparatus 100 communicates to execute the specified speed test.

At 710, the apparatus 100 may execute the speed test over the fiber optic interface to generate a first speed test result, execute the speed test over the Ethernet interface to generate a second speed test result, and execute the speed test over the WiFi interface to generate a third speed test result to segment service performance issues to the fiber optic cable, the electrical cable, or the wireless signals. The foregoing tests may be specified by the speed test so that a service performance issue may be segmented (by being localized to either a fiber optic connection, an Ethernet connection, and/or a WiFi connection). It should be appreciated that the apparatus 100 may localize service performance issues based on the device (such as the drop terminal 103, OTP 104, ONT 108, Router 110, or repeaters 112) with which the apparatus 100 interfaces to execute the tests.

In some examples, to execute the speed test via the fiber optic interface, the apparatus 100 may provide a transmit (Tx) electrical signal to the fiber optic interface. The fiber optic interface may convert the Tx electrical signal into a Tx optical signal and transmit the Tx optical signal via a fiber optic cable to the test server, such as the test server 315.

The apparatus 100 may receive an indication of the upload speed based on the transmitted Tx optical signal. The apparatus 100 may receive the Rx electrical signal from the fiber optic interface, and determine a download speed through the fiber optic cable based on the Rx electrical signal. The apparatus 100 may generate the first speed test result based on the upload speed and the download speed.

At 712, the apparatus 100 may transmit the first speed test result, the second speed test result, and the third speed test result to a remote device. The remote device may include the remote apparatus 120 and/or the cloud platform 170.

FIG. 8 illustrates a method 800 of integrating workflow profiles with UI actuations to trigger service performance tests of an optical network, according to an example. It should be understood that the method 800 may include additional operations and that some of the operations described therein may be removed and/or modified without departing from the scopes of the method 800. The description of the method 800 may be made with reference to the features depicted previous figures for purposes of illustration.

At 802, the apparatus 100 may receive a plurality of workflow profiles, each workflow profile of the plurality of workflow profiles comprising a plurality of parameters for executing a respective service performance test. The apparatus 100 may receive the workflow profile from cloud platform 130, via a network interface connected to a network (not illustrated) such as the Internet, or from a remote apparatus 120 via a device interface connected to the apparatus. The network may be accessed via the GPON (in which case the apparatus 100 may use the services provided to premises 11) or via other protocol (such as BLUETOOTH) through which the apparatus 100 may connect to remote devices.

At 804, the apparatus 100 may store the plurality of workflow profiles in a data storage, such as data storage 312.

At 806, the apparatus 100 may determine that an input member of the plurality of input members was actuated. In some examples, each of the plurality of workflow profiles may be assigned to a respective input member of the plurality of input members, and wherein to identify the workflow profile. The apparatus 100 may determine that the input member has been assigned to the identified workflow profile.

At 808, the apparatus 100 may identify a workflow profile based on the actuated input member. For example, the workflow profile may be assigned to the actuated input member such that actuation of the input member indicates that the workflow profile is to be executed. Alternatively, the workflow profile may be scrolled from among a plurality of workflow profiles and actuation of the input member may indicate that the workflow profile (which was scrolled among the plurality of workflow profiles) is to be executed.

At 810, the apparatus 100 may obtain the plurality of workflow parameters of the workflow profile from the data storage.

At 812, the apparatus 100 may execute a service performance test based on the plurality of workflow parameters. In some examples, the apparatus 100 may obtain a result of the executed service performance test and transmit the result to the cloud platform 170 via the network interface or the remote apparatus 120 via the device interface.

In some examples, the identified workflow profile may be automatically executed based on a one-touch actuation of the input member. In these examples, the apparatus 100 may initiate execution of the workflow profile assigned to the input member when the input member is actuated a single time, enabling single-press execution of the workflow profile. Execution of the workflow profile may include identifying the associated workflow parameters and conducting one or more tests based on the associated workflow parameters.

Figure 9:
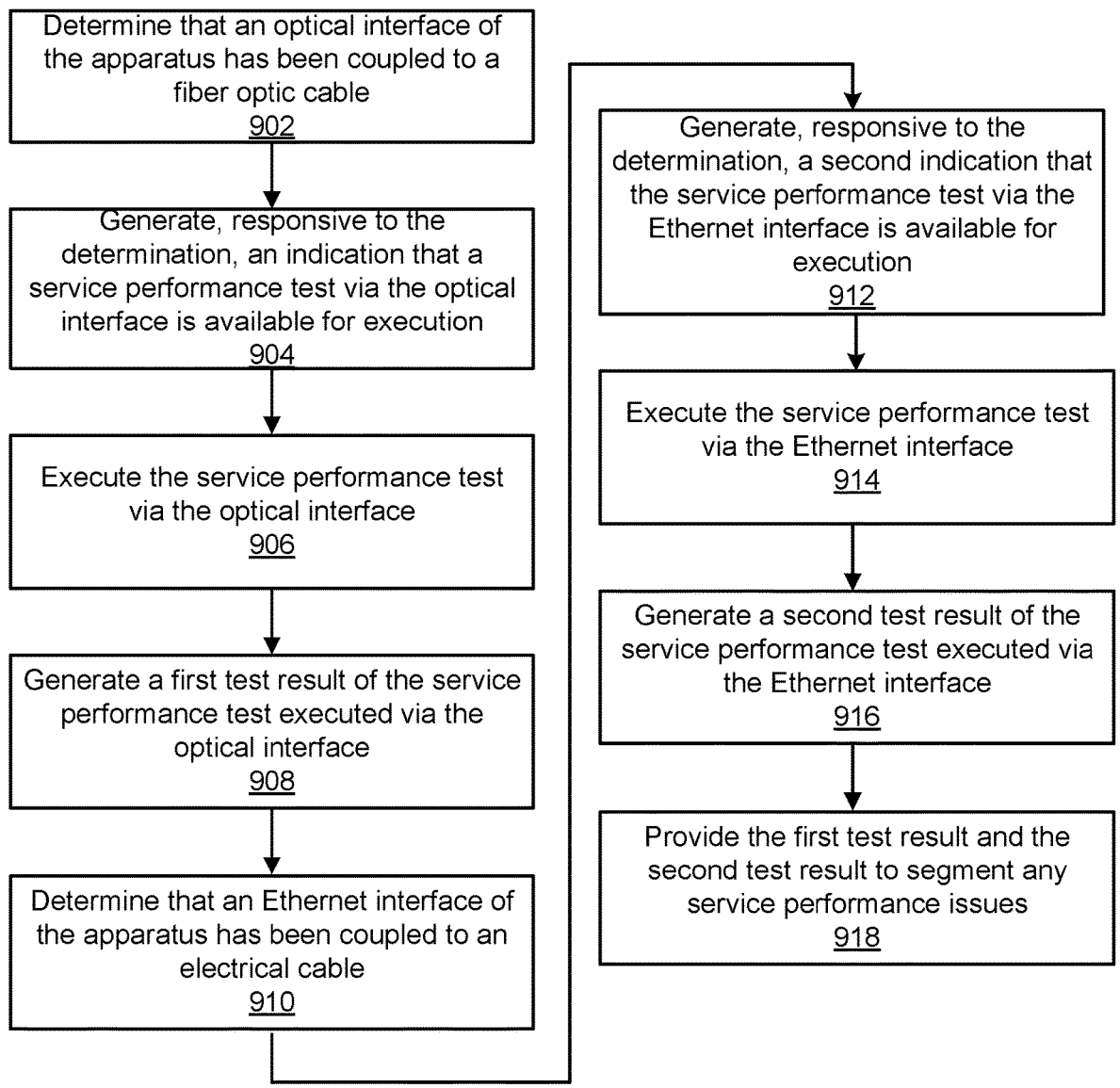
FIG. 9 illustrates a method of segmenting service performance issues, according to an example.

FIG. 9 illustrates a method 900 of segmenting service performance issues, according to an example. It should be understood that the method 900 may include additional operations and that some of the operations described therein may be removed and/or modified without departing from the scopes of the method 900. The description of the method 900 may be made with reference to the features depicted previous figures for purposes of illustration.

At 902, the apparatus 100 may determine that a fiber optic interface 22 of the apparatus has been coupled to a fiber optic cable 105. At 904, the apparatus 100 may generate, responsive to the determination, an indication that a service performance test via the fiber optic interface 22 is available for execution. At 906, the apparatus 100 may execute the service performance test via the fiber optic interface 22. At 908, the apparatus 100 may generate a first test result of the service performance test executed via the fiber optic interface 22. At 910, the apparatus 100 may determine that an Ethernet interface 24 of the apparatus has been coupled to an electrical cable. At 912, the apparatus 100 may generate, responsive to the determination, a second indication that the service performance test via the Ethernet interface 24 is available for execution.

At 914, the apparatus 100 may execute the service performance test via the Ethernet interface 24. At 916, the apparatus 100 may generate a second test result of the service performance test executed via the Ethernet interface 24. At 918, the apparatus 100 may provide the first test result and the second test result to segment any service performance issues. It should be noted that the apparatus 100 may also perform the service performance test via WiFi when the apparatus 100 is coupled to a wireless link 109.

Figure 10:
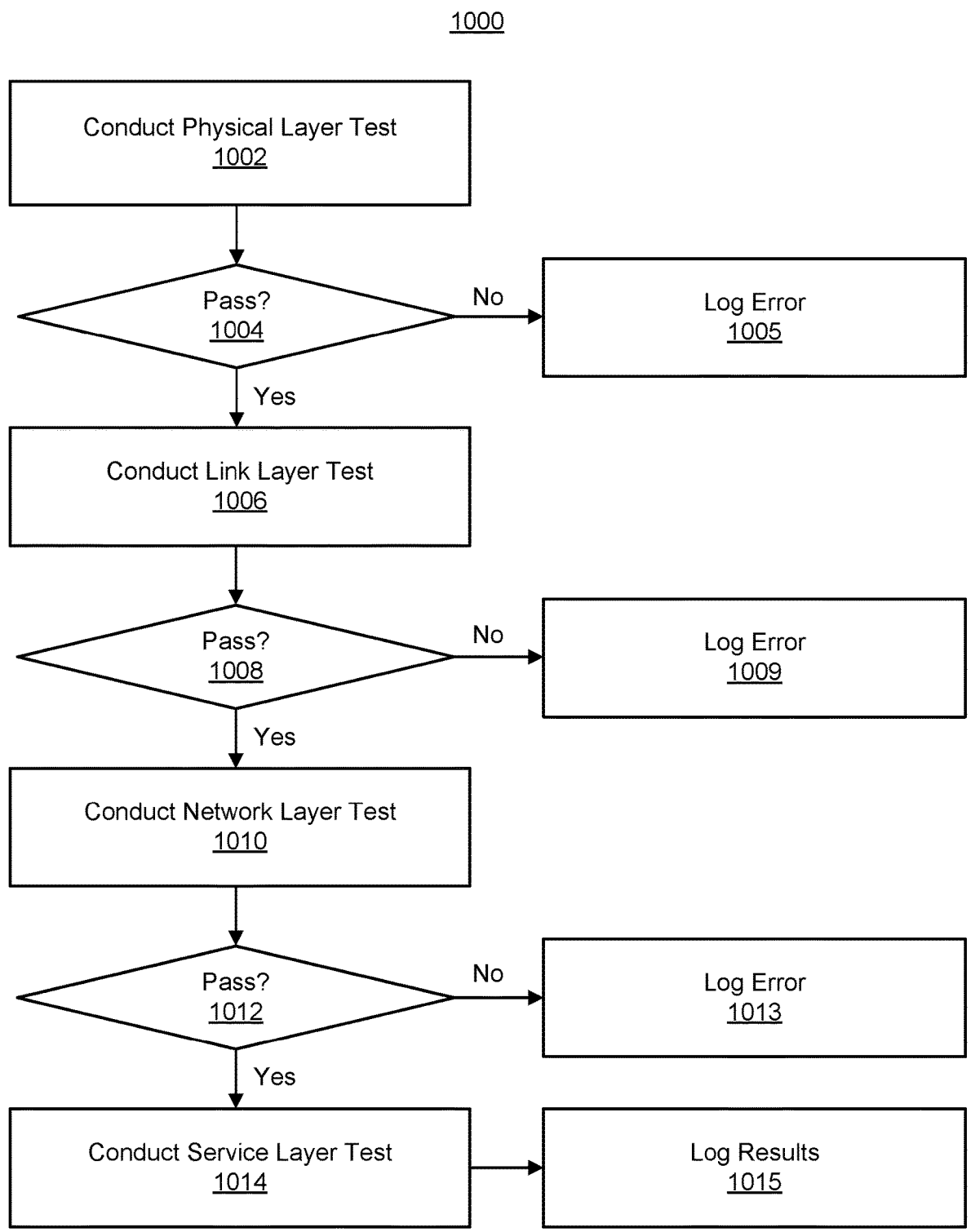
FIG. 10 illustrates a method of a workflow for testing various layers in a communication link, according to an example.

FIG. 10 illustrates a method 1000 of a workflow for testing various layers in a communication link, according to an example. It should be understood that the method 1000 may include additional operations and that some of the operations described therein may be removed and/or modified without departing from the scopes of the method 1000. The description of the method 1000 may be made with reference to the features depicted previous figures for purposes of illustration.

The method 1000 may be used to test various layers for a given link type, such as an optical link, an Ethernet link and a wireless link. At 1002, the apparatus 100 may conduct a physical layer test. For example, for an optical link, the apparatus 100 may measure optical power levels; for an Ethernet link, the apparatus 100 may measure the Ethernet signal; for a WiFi signal, the apparatus 100 may measure the WiFi signal strength. At 1004, the apparatus 100 may determine whether the physical layer test passed. The determination may be based on a predefined threshold value for the link type. If not, at 1005, the apparatus 100 may log errors that indicate why the physical layer test did not pass.

If the physical layer test passed, indicating that any problem is not with the physical layer for this link type, at 1006, the apparatus may conduct a link layer test. For example, for an optical link, the apparatus 100 may determine whether the appropriate OLT is connected to, whether an OLT is configured for an ONT and vice versa; for an Ethernet link, the apparatus 100 may measure determine a level of Ethernet traffic; for a WiFi signal, the apparatus 100 may determine whether the correct WiFi settings are being used (e.g., correct BSSID, security type, and band). At 1008, the apparatus 100 may determine whether the link layer test passed. If not, at 1009, the apparatus 100 may log errors that indicate why the link layer test did not pass.

If the link layer test passed, indicating that any problem is not with the link layer for this link type, at 1010, the apparatus may conduct a network layer test. For example, for optical, Ethernet, and WiFi links, the apparatus 100 may determine whether an IP address is being obtained and whether authentication access has been granted. At 1012, the apparatus 100 may determine whether the network layer test passed. If not, at 1013, the apparatus 100 may log errors that indicate why the network layer test did not pass.

If the network layer test passed, indicating that any problem is not with the link layer for this link type, at 1014, the apparatus may conduct a service layer test. For example, for optical, Ethernet, and WiFi links, the apparatus 100 may conduct a speedtest or other throughput test. At 1015, the apparatus 100 may log the results of the service layer test and/or other tests conducted in the method 1000.

Figure 11:
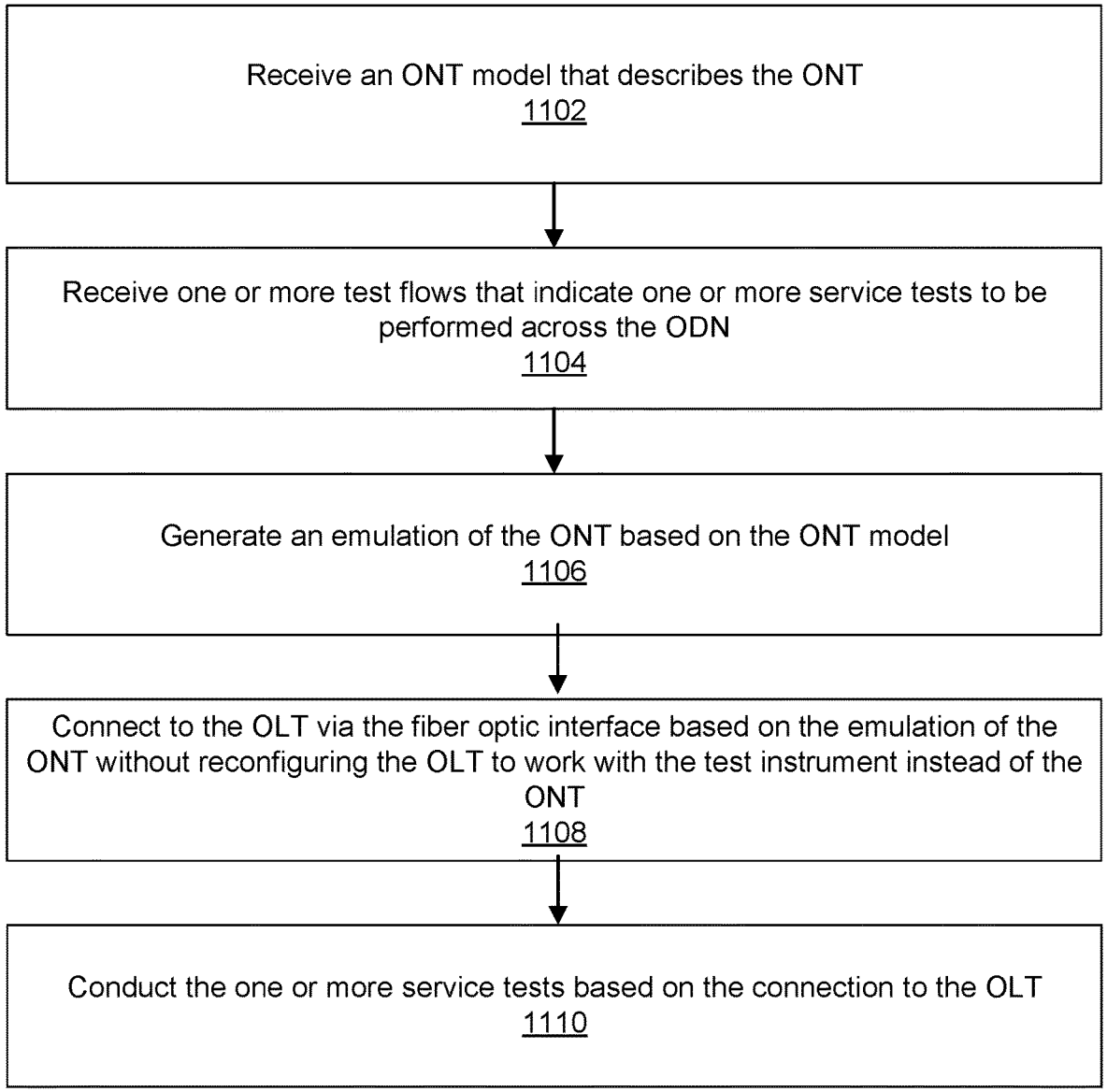
FIG. 11 illustrates a method of emulating different ONTs based on workflows for testing service performance, according to an example.

FIG. 11 illustrates a method 1100 of emulating different ONTs based on workflows for testing service performance, according to an example. It should be understood that the method 1100 may include additional operations and that some of the operations described therein may be removed and/or modified without departing from the scopes of the method 1100. The description of the method 1100 may be made with reference to the features depicted previous figures for purposes of illustration.

At 1102, a test instrument (such as the apparatus 100) may receive an ONT model that describes the ONT. At 1104, the test instrument may receive one or more test flows that indicate one or more service tests to be performed across the ODN. At 1106, the test instrument may generate an emulation of the ONT based on the ONT model. At 1108, the test instrument may connect to the OLT via the fiber optic interface based on the emulation of the ONT without reconfiguration of the OLT to work with the test instrument instead of the ONT. At 1110, the test instrument may conduct the one or more service tests based on the connection to the OLT.

FIG. 12 illustrates a method 1200 of identifying ONT information for emulating different ONTs for testing service performance, according to an example. It should be understood that the method 1200 may include additional operations and that some of the operations described therein may be removed and/or modified without departing from the scopes of the method 1200. The description of the method 1200 may be made with reference to the features depicted previous figures for purposes of illustration.

At 1202, the method 1200 may include Identifying ONT information that describes an ONT and is used to configure an OLT to work with the ONT. At 1204, the method 1200 may include configuring a test instrument based on the ONT information. At 1206, the method 1200 may include establishing a connection between the test instrument and the OLT based on the configuring. At 1208, the method 1200 may include conducting, via the test instrument, one or more service tests based on the connection between the test instrument and the OLT.

Some or all of the operations set forth in each of the methods 600-1200 may be executed by the components illustrated in FIGS. 1A, 1B, 2A, 2B, 3A, 3B, and/or 4A-C. In addition, each of the methods 600-1200 may be embodied by computer programs, which may exist in a variety of forms. For example, some operations of each of the methods 600-1200 may exist as machine-readable instructions, including source code, object code, executable code or other formats. Any of the above may be embodied on a non-transitory computer readable storage medium and/or hardware.

Although described specifically throughout herein, representative examples may also have utility over a wide range of applications, and the above discussion is not intended and should not be construed to be limiting, but is offered as an illustrative discussion of specific examples.

What has been described and illustrated herein is an example along with some of its variations. The terms, descriptions and figures used herein are set forth by way of illustration only and are not meant as limitations. For example, although the apparatus (such as a test instrument) is described herein as emulating an ONT for communication with an OLT, other devices in other types of communication networks may be emulated as well. Many variations are possible within the spirit and scope of the examples described herein, which is intended to be defined by the following claims—and their equivalents—in which all terms are meant in their broadest reasonable sense unless otherwise indicated.

The invention claimed is:

1. A portable field-deployable test instrument for emulating an Optical Network Terminal (ONT) to test network services at a customer premises, comprising:
 a data storage to store an ONT model that describes an ONT installed for the customer premises and connected to an Optical Line Terminal (OLT) that controls information flow for the customer premises through an optical data network (ODN);
 a fiber optic interface to couple the test instrument with the OLT, wherein the OLT is to operate with the ONT based on information included in the ONT model;

a controller coupled to the fiber optic interface, wherein the controller is to:
  access the ONT model;
  generate an emulation of the ONT based on the ONT model;
  connect to the OLT via the fiber optic interface based on the emulation of the ONT without reconfiguration of the OLT to work with the test instrument instead of the ONT; and
  perform one or more service tests across the ODN based on the connection to the OLT, wherein the one or more service tests include testing a physical layer of data communication through a fiber optic cable connecting the customer premises to the ODN by obtaining power levels of optical signals received at an optical detector of the test instrument via the fiber optic interface;
an Ethernet tester;
an Ethernet interface connectable to a router at the customer premises via an electrical cable, wherein the Ethernet tester tests physical layer data communication by transmitting data through the Ethernet interface to the router via the electrical cable, and determining whether electrical signals are being received through the Ethernet interface responsive to the transmitted data;
a Wireless Fidelity (WiFi) tester; and
a WiFi interface connectable to at least one of the router at the customer premises and a repeater at the customer premises via a wireless link, wherein the WiFi tester tests physical layer data communication through the wireless link by measuring a wireless signal strength of the wireless link.

2. The test instrument of claim 1, wherein the ONT model includes ONT authentication information, and wherein to connect to the OLT, the controller is to:
  provide the ONT authentication information to authenticate the test instrument with the OLT.

3. The test instrument of claim 2, wherein the ONT model includes ONT hardware configuration information of the ONT, and wherein the controller is to:
  transmit at least some of the ONT hardware configuration information to the OLT.

4. The test instrument of claim 3, wherein the ONT hardware configuration information specifies hardware that the ONT includes but that the test instrument does not include.

5. The test instrument of claim 3, wherein the ONT model includes ONT soft configuration information, and wherein to connect to the OLT, the controller is to:
  use at least some of the ONT soft configuration information for the connection to the OLT.

6. The test instrument of claim 5, wherein to use at least some of the ONT soft configuration information, the controller is to configure network communication packets of the test instrument based on the ONT soft configuration information.

7. The test instrument of claim 1, wherein the OLT is configured to specifically work with at least a second ONT of a second premises separate from a premises associated with the ONT, and wherein the controller is to:
  access a second ONT model that describes the second ONT;
  generate a second emulation of the second ONT based on the second ONT model;
  connect to the OLT from the second premises via the fiber optic interface based on the second emulation of the second ONT without reconfiguration of the OLT to work with the test instrument instead of the second ONT; and
  perform the one or more service tests across the ODN based on the connection to the OLT from the second premises.

8. The test instrument of claim 7, wherein the second ONT comprises a different vendor, model, and/or version than the ONT.

9. The test instrument of claim 7, wherein the ONT is associated with a service provider that is different than a second service provider associated with the second ONT, and wherein the ONT model is different than the second ONT model based on a difference between the service provider and the second service provider.

10. The test instrument of claim 1, wherein to perform the one or more service tests, the controller is to:
  perform a service test originating from a location at which the ONT is installed at a premises.

11. The test instrument of claim 1, wherein to perform the one or more service tests, the controller is to:
  perform a service test from a second location, wherein the second location is different from a location where the ONT is installed.

12. The test instrument of claim 1, wherein the controller is to receive the ONT model from a remote apparatus or a cloud platform.

13. A portable field-deployable test instrument for emulating an Optical Network Terminal (ONT) to test network services at a customer premises, comprising:
  a fiber optic interface configured to couple the test instrument with an Optical Line Terminal (OLT) that controls information flow through an optical data network (ODN) to the ONT, wherein the OLT is configured to operate with the ONT;
  a controller coupled to the fiber optic interface, wherein the controller is to:
    receive an ONT model that describes the ONT;
    store a workflow profile specifying tests to be performed and an order of the tests to be performed, and wherein the controller determines whether at least one of the tests passed, and responsive to determining the at least one of the tests passed, the controller executes at least one other test of the tests based on the order;
    generate an emulation of the ONT based on the ONT model;
    connect to the OLT via the fiber optic interface based on the emulation of the ONT without reconfiguration of the OLT to work with the test instrument instead of the ONT, wherein the one or more service tests include testing a physical layer of data communication by obtaining power levels of optical signals received at an optical detector of the test instrument; and
    perform the one or more service tests based on the connection to the OLT;
  an Ethernet tester;
  an Ethernet interface connectable to a router at the customer premises via an electrical cable, wherein the Ethernet tester tests physical layer data communication by transmitting data through the Ethernet interface to the router via the electrical cable, and determining whether electrical signals are being received through the Ethernet interface responsive to the transmitted data;
  a Wireless Fidelity (WiFi) tester; and a WiFi interface connectable to at least one of the router at the customer premises and a repeater at the customer premises via a wireless link, wherein the WiFi tester tests physical layer data communication through the wireless link by measuring a wireless signal strength of the wireless link.

14. The test instrument of claim 13, wherein the ONT model includes ONT authentication information.

15. The test instrument of claim 13, wherein the ONT model includes ONT hardware configuration information and/or ONT soft configuration information.

16. The test instrument of claim 13, wherein the ONT model and/or the workflow profile are received from a remote apparatus or a cloud platform.

17. A method of emulating an Optical Network Terminal (ONT) to connect to and test network services of an Optical Line Terminal (OLT) that is specifically configured by a service provider to work with the ONT, the method comprising:
    identifying ONT information that describes the ONT and is used to configure the OLT to work with the ONT;
    configuring a portable field-deployable test instrument based on the ONT information;
    establishing a connection between the test instrument and the OLT based on the configuring;
    conducting, via the test instrument, a first service test based on the connection between the test instrument and the OLT, wherein the first service test includes testing a physical layer of data communication by obtaining power levels of optical signals received at an optical detector of the test instrument;
    conducting, via the test instrument, a second service test based on a connection between an Ethernet interface of the test instrument and a router at a customer premises, wherein the second service test includes testing a physical layer Ethernet test by transmitting data through the Ethernet interface to the router, and determining whether electrical signals are being received through the Ethernet interface responsive to the transmitted data; and
    conducting, via the test instrument, a third service test based on a connection between a Wireless Fidelity (WiFi) interface of the test instrument and at least one of the router at the customer premises and a repeater at the customer premises via a wireless link, wherein the third service test includes testing physical layer data communication through the wireless link by measuring a wireless signal strength of the wireless link.

18. The method of claim 17, wherein the ONT information comprises authentication information used by the ONT to connect to the OLT, and wherein configuring the test instrument comprises:
    copying the authentication information, wherein establishing the connection comprises transmitting the authentication information from the test instrument to the OLT.

19. The method of claim 17, wherein the ONT information comprises one or more network configurations used by the ONT, and wherein configuring the test instrument comprising:
    setting one or more network configurations of the test instrument based on the one or more network configurations.

20. The method of claim 17, wherein the ONT information comprises an indication of a number of ports included with the ONT, the method further comprising:
    transmitting, from the test instrument to the OLT, an indication that the test instrument includes the number of ports.

* * * * *